United States Patent
Kondo et al.

(10) Patent No.: US 9,595,890 B2
(45) Date of Patent: Mar. 14, 2017

(54) SWITCHING CONTROL APPARATUS OF LOAD DRIVE SYSTEM

(71) Applicant: DENSO CORPORATION, Kariya, Aichi-pref. (JP)

(72) Inventors: Taizo Kondo, Kariya (JP); Takahumi Oowada, Kariya (JP)

(73) Assignee: DENSO CORPORATION, Kariya (JP)

( * ) Notice: Subject to any disclaimer, the term of this patent is extended or adjusted under 35 U.S.C. 154(b) by 36 days.

(21) Appl. No.: 14/681,480

(22) Filed: Apr. 8, 2015

(65) Prior Publication Data
US 2015/0311821 A1 Oct. 29, 2015

(30) Foreign Application Priority Data
Apr. 23, 2014 (JP) .................................. 2014-89352

(51) Int. Cl.
*H02M 7/537* (2006.01)
*H02M 7/5387* (2007.01)
*H02M 3/158* (2006.01)
*H02M 1/32* (2007.01)
*H02M 1/00* (2006.01)

(52) U.S. Cl.
CPC ..... *H02M 7/53875* (2013.01); *H02M 3/1588* (2013.01); *H02M 1/32* (2013.01); *H02M 2001/007* (2013.01); *Y02B 70/1466* (2013.01)

(58) Field of Classification Search
CPC .. Y02B 70/1466; H02M 3/1588; H02M 1/38; H02M 7/53875; H02M 1/32; H02M 2001/007; H02M 7/5387; H02M 1/36; H02M 7/4807; H02M 7/44; H02M 7/42; B60L 11/1861; H02P 27/06
See application file for complete search history.

(56) References Cited

U.S. PATENT DOCUMENTS

| | | | | | |
|---|---|---|---|---|---|
| 5,416,686 A | * | 5/1995 | Azuma | ............... | H02M 5/4585 363/37 |
| 6,479,956 B1 | * | 11/2002 | Kawabata et al. | ...... | H02P 6/085 318/400.12 |
| 7,656,690 B2 | * | 2/2010 | Yamada | ................. | H02M 1/38 363/41 |

(Continued)

FOREIGN PATENT DOCUMENTS

| EP | 2916443 A1 * | 9/2015 | .......... B60L 11/1803 |
|---|---|---|---|
| JP | 2011-160570 | 8/2011 | |

OTHER PUBLICATIONS

JP-2011-160570 english translation, https://www4.j-platpat.inpit.go.jp/cgi-bin/tran_web_cgi_ejje?u=http://www4.j-platpat.inpit.go.jp/eng/translation/20160624020556952765641819767751 7BD4A5770FC1B07EBD2AA2E9FAB5556CF.*

*Primary Examiner* — Gustavo Rosario Benitez
(74) *Attorney, Agent, or Firm* — Nixon & Vanderhye PC

(57) ABSTRACT

A switching control apparatus is applied to a load drive system that includes a DC voltage converter having a reactor and at least one switching element, and a power transducer including multiple switching element pairs. The switching control apparatus controls a switching timing of the switching element in the DC voltage converter and the switching element pairs in the power transducer. The switching control apparatus includes a DC voltage converter control circuit, a DC voltage converter drive circuit, a power transducer control circuit, a power transducer drive circuit, a switching prohibition period calculation portion, and a switching correction portion.

12 Claims, 15 Drawing Sheets

(56) References Cited

U.S. PATENT DOCUMENTS

| | | | |
|---|---|---|---|
| 8,810,176 B2* | 8/2014 | Kawakami | H02P 6/10 318/400.22 |
| 2006/0250728 A1 | 11/2006 | Hussein | |
| 2010/0246217 A1* | 9/2010 | Sakakibara | H02M 1/32 363/37 |
| 2012/0146613 A1* | 6/2012 | Hamanaka | H03K 17/567 323/311 |
| 2013/0242438 A1* | 9/2013 | Fukuta | H02H 1/0007 361/18 |
| 2014/0028225 A1* | 1/2014 | Takamatsu | H02P 6/08 318/400.3 |
| 2014/0042939 A1* | 2/2014 | Kobayashi | H02P 27/08 318/400.3 |
| 2015/0311851 A1* | 10/2015 | Kondo | H02P 27/085 318/400.27 |

* cited by examiner

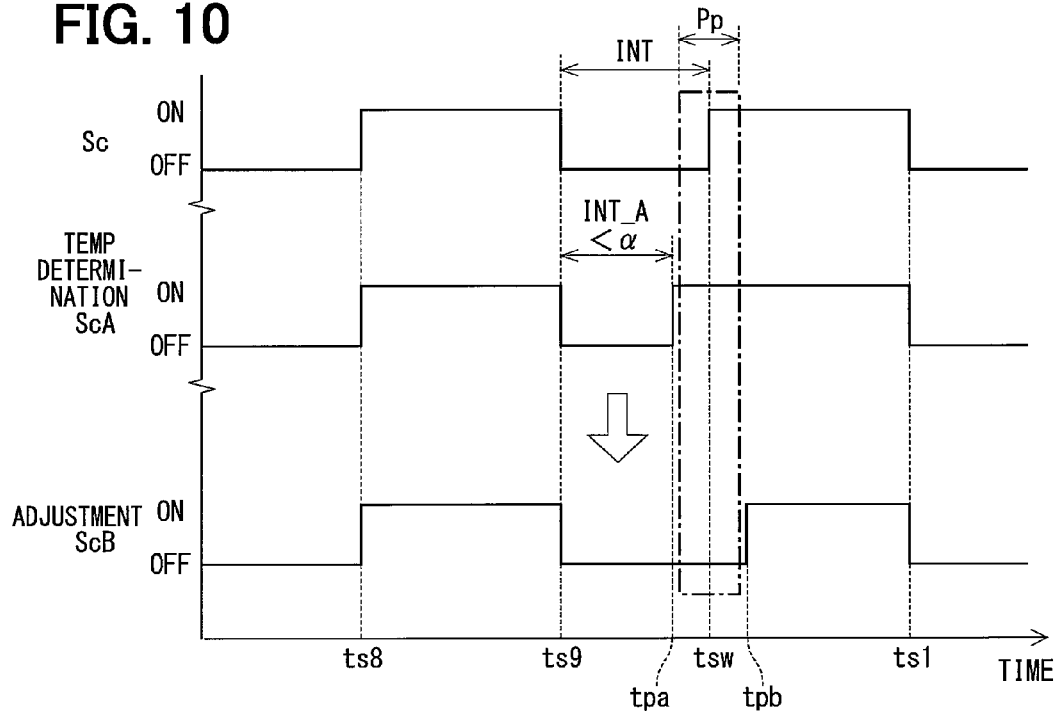
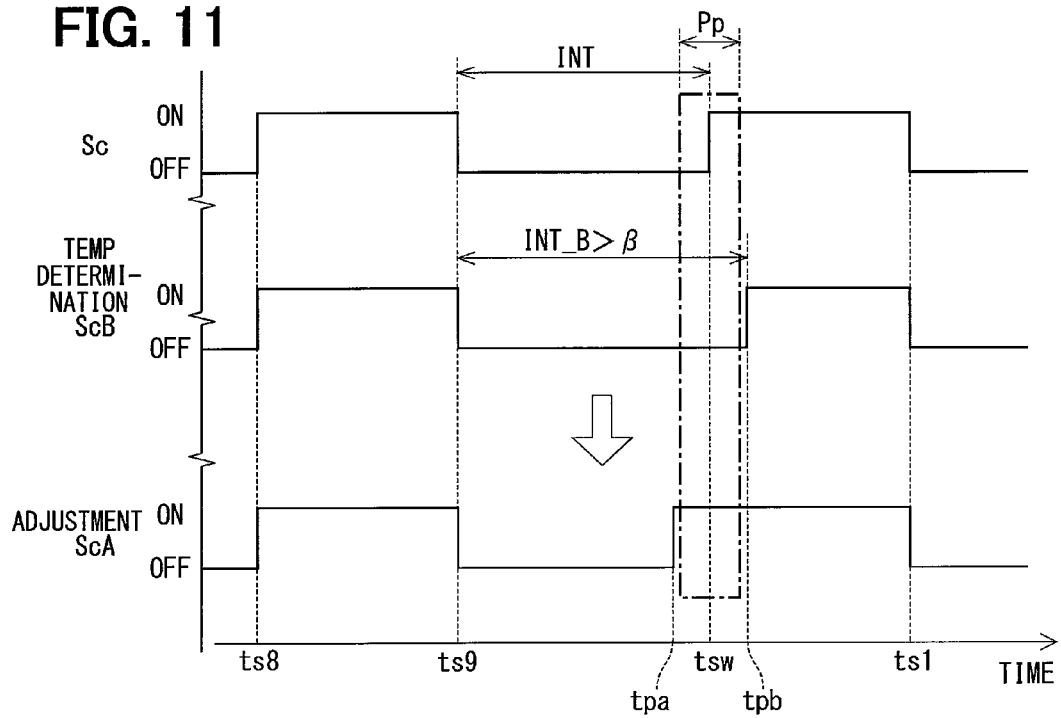

FIG. 16

$$IL\_est = \frac{Nm \times trq}{VH} + \frac{Vin}{L} \times \frac{Toff}{2} \quad \cdots \quad (1)$$

FIG. 17

| DRV SIGNAL | IL > 0 | IL < 0 |
|---|---|---|
| RISE UP | INIT TIMING | END TIMING |
| FALL DOWN | END TIMING | INIT TIMING |

FIG. 18

| DRV SIGNAL | VH > VHcom | VH < VHcom |
|---|---|---|
| RISE UP | INIT TIMING | END TIMING |
| FALL DOWN | END TIMING | INIT TIMING |

FIG. 19

| PATTERN | (1) | 2 | 3 | (4) |
|---|---|---|---|---|
| Vu | A | B | A | B |
| Vv | A | A | B | B |

FIG. 20

| PATTERN | (1) | 2 | 3 | 4 | 5 | 6 | 7 | (8) |
|---|---|---|---|---|---|---|---|---|
| Vu | A | B | A | B | A | B | A | B |
| Vv | A | A | B | B | A | A | B | B |
| Vw | A | A | A | A | B | B | B | B |

FIG. 21

$$\begin{bmatrix} V_d \\ V_q \end{bmatrix} = \sqrt{\frac{2}{3}} \begin{bmatrix} \cos(-\theta) & \cos\left(-\theta + \frac{2\pi}{3}\right) & \cos\left(-\theta + \frac{4\pi}{3}\right) \\ \sin(-\theta) & \sin\left(-\theta + \frac{2\pi}{3}\right) & \sin\left(-\theta + \frac{4\pi}{3}\right) \end{bmatrix} \begin{bmatrix} V_u \\ V_v \\ V_w \end{bmatrix} \quad \cdots (2)$$

FIG. 22A $$I_d = \frac{RV_d + \omega L_q V_q - \omega^2 L_q \phi}{\omega^2 L_d L_q + R^2} \quad \cdots (3.1)$$

FIG. 22B $$I_q = \frac{RV_q - \omega L_d V_d - \omega R \phi}{\omega^2 L_d L_q + R^2} \quad \cdots (3.2)$$

FIG. 23

$$trq\_est = P\{I_q \phi + (L_d - L_q) I_d I_q\} \quad \cdots (4)$$

SWITCHING CONTROL APPARATUS OF LOAD DRIVE SYSTEM

CROSS REFERENCE TO RELATED APPLICATION

This application is based on Japanese Patent Application No. 2014-89352 filed on Apr. 23, 2014, the disclosure of which is incorporated herein by reference.

TECHNICAL FIELD

The present disclosure relates to a switching control apparatus controlling an operation of a switching element to a DC voltage converter and an electric power transducer converting DC power that is output from the DC voltage converter.

BACKGROUND

Patent literature 1: JP2011-160570 A

Conventionally, in a switching control apparatus controlling an operation of a switching element to a DC voltage converter and an electric power transducer that converts DC power output from the DC voltage converter, a technology to prevent superposition of surge voltage is known. The surge voltage may occur when switching timings of switching elements are overlapped.

For example, a switching control apparatus disclosed in patent literature 1 corrects and delays a switching timing of an inverter to the end of a predetermined inverter shielding period (corresponding to a switching prohibition period) when the switching timing of a switching element in a boost converter, which is a DC voltage converter, overlaps the switching timing of a switching element in an inverter, which is a power transducer.

The inventors of the present application have found the following. The switching control apparatus in patent literature 1 may largely delay the switching timing of the inverter according to a relationship of the switching timings of the boost converter and the inverter. In this case, a controllability of the switching control apparatus may be reduced.

SUMMARY

It is an object of the present disclosure to provide a switching control apparatus to avoid occurrence of supposition surge in a DC voltage converter and the transducer and to prevent a reduction of a controllability.

According to one aspect of the present disclosure, a switching control apparatus is applied to a load drive system that includes a DC voltage converter having a reactor that enables to store and release electric energy and at least one switching element connected to the reactor, and converting an input voltage, which is input from a DC power source to the reactor, to an output voltage by turning ON and OFF the at least one switching element, and a power transducer including multiple switching element pairs having a high potential switching element and a low potential switching element, converting DC power, which is output from the DC voltage converter, to AC power, and outputting the AC power to a load by turning ON and OFF the multiple switching element pairs. The switching control apparatus controls a switching timing of the switching element in the DC voltage converter and the switching element pairs in the power transducer, the switching control apparatus includes a DC voltage converter control circuit calculating control amount of the DC voltage converter according to a command voltage to the output voltage of the DC voltage converter, a DC voltage converter drive circuit driving the switching element in the DC voltage converter according to the control amount of the DC voltage converter calculated by the DC voltage converter control circuit, a power transducer control circuit calculating control amount of the power transducer according to a required output that the load requests, a power transducer drive circuit driving the switching element pairs in the power transducer according to the control amount of the power transducer calculated by the power transducer control circuit, a switching prohibition period calculation portion calculating a switching prohibition period, and a switching correction portion determining a correction direction of a correction object switching timing and correcting the correction object switching timing to the correction direction. The switching prohibition period corresponds to a period when the switching element in the DC voltage converter is prohibited from switching for a predetermined period synchronized with a first certain switching timing before the first certain switching timing of at least one of the switching element pairs in the power transducer, or a period when the switching element pairs in the power transducer are prohibited from switching for a predetermined period synchronized with a second certain switching timing before the second certain switching timing of the at least one switching element in the DC voltage converter. When the first certain switching timing of the at least one of the switching element pairs in the power transducer or the second certain switching timing of the at least one switching element in the DC voltage converter is predicted to be in the switching prohibition period, the first certain switching timing and the second certain switching timing correspond to the correction object switching timing. The switching correction portion determines a correction direction of the correction object switching timing and determines whether the correction object switching timing is advanced to an initiation timing of the switching prohibition period or the correction object switching timing is delayed to an end timing of the switching prohibition period. When the switching correction portion determines the correction direction, the switching correction portion corrects the correction object switching timing to the determined correction direction.

According to the switching control apparatus in the present disclosure, it may be possible to avoid occurrence of supposition surge in a DC voltage converter and the transducer, and it may be possible to prevent a reduction of a controllability.

BRIEF DESCRIPTION OF THE DRAWINGS

The above and other objects, features and advantages of the present disclosure will become more apparent from the following detailed description made with reference to the accompanying drawings. In the drawings:

FIG. 1 is a diagram illustrating a whole configuration of a motor generator drive system that a switching control apparatus in a first to third embodiments is applied to;

FIG. 10 is a timing chart illustrating correction direction adjustment processing according to the third embodiment in the present disclosure;

FIG. 11 is a timing chart illustrating correction direction adjustment processing according to the third embodiment in the present disclosure;

FIG. 13 is a diagram illustrating a whole configuration of a motor generator drive system that a switching control apparatus in a fourth and fifth embodiments are applied to;

FIG. 16 is a diagram illustrating an expression 1 for estimating a reactor current;

FIG. 17 is a diagram illustrating a table 1 for correcting a rise-up timing or a fall-down timing of a drive signal;

FIG. 18 is a diagram illustrating a table 2 for correcting a rise-up timing or a fall-down timing of a drive signal;

FIG. 19 is a diagram illustrating a table 3 and representing four patterns in which it is determined whether the switching timing is advanced to the switching prohibition period initiation timing or is delayed to the switching prohibition period end timing in each phase;

FIG. 20 is a diagram illustrating a table 4 and representing eight patterns in which it is determined whether the switching timing is advanced to the switching prohibition period initiation timing or is delayed to the switching prohibition period end timing in each phase;

FIG. 21 is a diagram illustrating an expression 2 for performing a dq-conversion of the three-phase voltages;

FIG. 22A is a diagram illustrating an expression 3.1 for calculating a d-axis estimated current;

FIG. 22B is a diagram illustrating an expression 3.2 for calculating a q-axis estimated current; and FIG. 23 is a diagram illustrating an expression 4 for calculating an estimated torque.

DETAILED DESCRIPTION

Figure 1:
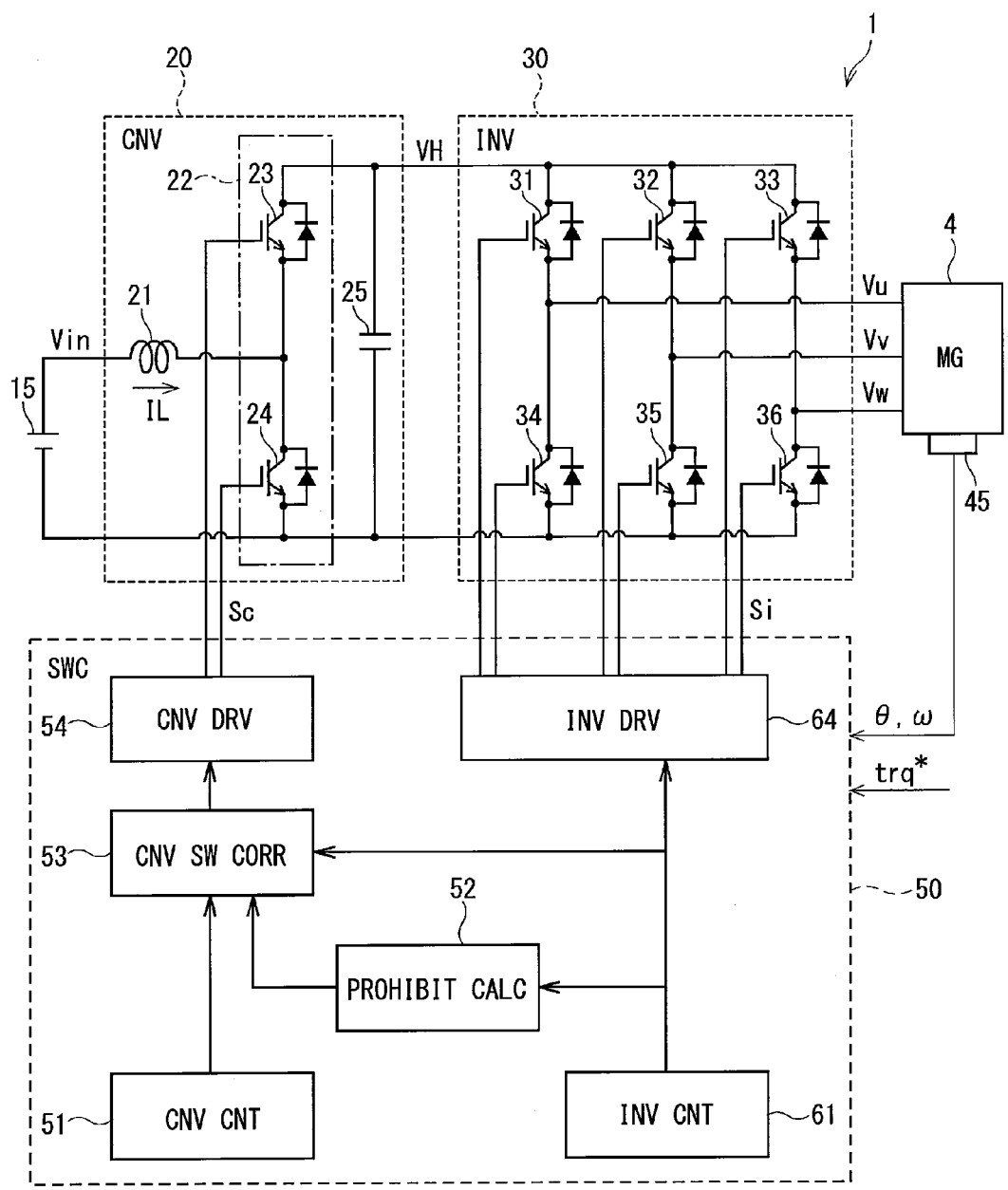

In the following, embodiments of a switching control apparatus in the present disclosure will be explained with referring to the drawings. A configuration and a step substantially identical in multiple embodiments have the identical symbol or the identical step number, and an explanation of the substantially identical configurations or steps will be omitted.

The switching control apparatus in the embodiments of the present disclosure will be applied to a drive system (referred to as a motor generator drive system) that drives a motor generator used as a power source in a hybrid vehicle or an electric vehicle, for example. The motor generator drive system includes a boost converter that boosts power voltage of a battery and an inverter that converts direct current (DC) power output from the boost converter to alternate current (AC) power and outputs to a motor generator.

The boost converter and the inverter are driven by ON/OFF operation performed by a respective switching element. The switching control apparatus in the present disclosure correct a switching timing with respect to the switching timing turning ON/OFF of a switching element, in order to avoid a superposition surge. In order to correct the switching timing, the switching timing of the boost converter may be corrected or the switching timing of the inverter may be corrected.

Hereinafter, a case where the switching timing of the boost converter may be corrected will be explained in the first to third embodiments, and a case where the switching timing of the inverter may be corrected will be explained in the fourth and fifth embodiments. The phrase of "the present embodiments" is used for explaining a common matter in the first to fifth embodiments.

(Correction of Switching Timing in Boost Converter)

A configuration and an effect common in the switching control apparatus in the first to third embodiments will be explained with referring to the drawings of FIG. 1 to FIG. 3.

As described in FIG. 1, the motor generator drive system 1 includes a battery 15, a boost converter 20, an inverter 30, a motor generator 4, and a switching control apparatus 50, or the like. The motor generator drive system 1 corresponds to a load drive system. The battery 15 corresponds to a DC power source. The boost converter 20 corresponds to a DC voltage converter. The inverter 30 corresponds to a power transducer. The motor generator (MG) 4 corresponds to a load.

A system configuration other than the boost converter 20 and the inverter 30 will be explained.

The battery 15 corresponds to a DC power source that is configured from a chargeable/dischargeable electrical storage device such as a nickel hydrogen battery, a lithium ion battery, or the like. Incidentally, the DC power source may be an electric double layered capacitor or the like.

The motor generator 4 corresponds to, for example, a three phase alternating current (AC) motor of a permanent magnet synchronous type. The motor generator 4 includes a function as a motor in a narrow sense that generates torque for driving a driving wheel through a gearbox or the like by powering operation. The motor is mounted to a hybrid vehicle or an electric powered vehicle. In addition, the motor generator 4 includes a function as an electric generator generating electricity by regeneration operation with torque transmitted from an engine or a driving wheel.

A rotation angle sensor 45 is provided to the vicinity of a rotor of the motor generator 4. The rotation angle sensor 45 is configured from, for example, a resolver, a rotary encoder, and detects electrical angle θ. The electrical angle θ detected by the rotation angle sensor 45 is input to the switching control apparatus 50. The electrical angle θ is used for calculation such as a dq conversion for a current vector control. The electrical angle θ is differentiated by time and electric angular speed ω is calculated. The electric angle rate ω may be calculated in the inside or outside of the switching control apparatus 50.

A configuration of the boost converter 20 will be explained. The boost converter 20 includes a reactor 21, a boost drive portion 22, a smoothing capacitor 25, or the like.

The reactor 21 has inductance L, and induced voltage is generated accompanied with a variation of current IL, so that the reactor 21 stores electric energy.

The boost drive portion 22 includes a high potential switching element 23 and a low potential switching element 24. The high potential switching element 23 is connected between an output terminal of the reactor 21 and a high potential line of the inverter 30. The low potential switching element 24 is connected between the output terminal of the reactor 21 and a negative electrode of the battery 15. Incidentally, the high potential switching element 23 may also be referred to as an upper arm switching element, and the low potential switching element 24 may also be referred to as a lower arm switching element. The upper arm switching element and the lower arm switching element may also be referred to as upper and lower switching elements together.

Figure 3:
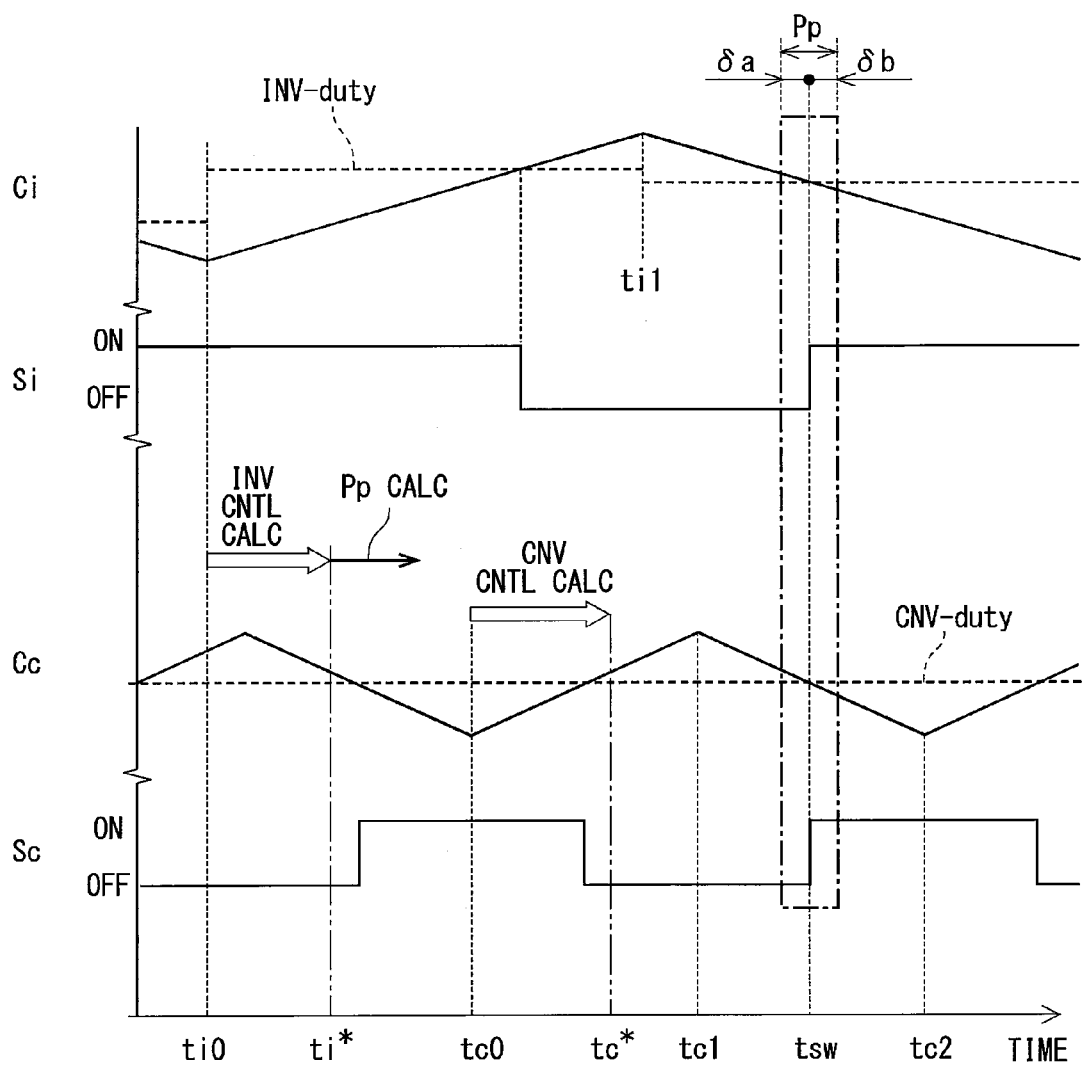
FIG. 3 is a timing chart explaining a switching prohibition period.

The upper and lower arm switching elements 23, 24 are alternately and complementarily perform ON/OFF operation according to a converter drive signal Sc transmitted from the boost converter drive circuit 54 (referring to FIG. 3).

The boost drive portion 22 in the present embodiment functions as a switching element pair. Incidentally, a boost drive portion in another embodiment according to the present disclosure may be configured from one or more switching elements without configuring a pair.

The reactor current IL flows through the reactor 21 and the reactor 21 stores energy when the high potential switching element 23 is in an OFF state and the low potential switching element 24 is in an ON state.

The energy stored in the reactor 21 is released when the high potential switching element 23 is in the ON state and the low potential switching element 24 is in the OFF state. Inductive voltage is superposed on battery input voltage Vin, and boosted output voltage VH is charged to the smoothing capacitor 25.

The inverter 30 includes three-phase switching element pairs, which are configured from high potential switching elements 31, 32, 33 and low potential switching elements 34, 35, 36 connected in bridge. The three phases correspond to a U-phase, a V-phase, and a W-phase. As similar to the boost converter 20, each of the high potential switching elements 31, 32, 33 may also be referred to as an upper arm switching element, and each of the low potential switching elements 34, 35, 36 may also be referred to as a lower arm switching element. The upper and lower arm switching elements may also be referred to as a paired switching element. The upper arm switching element and the lower arm switching element may also be referred to as the upper and lower arm switching element.

The upper and lower arm switching elements 31-36 in each phase (the upper arm switching elements 31-33 and the lower arm switching elements 34-36 in each phase) alternately and complementarily perform ON/OFF operation according to the inverter drive signal Si transmitted from the inverter drive circuit 64 (referring to FIG. 3).

The inverter 30 receives DC power of the output voltage VH, which has been boosted by the boost converter 20 from the battery input voltage Vin. The upper and lower arm switching elements 31-36 in each phase perform ON/OFF operation, the DC power VH is converted to three phase AC power Vu, Vv, Vw, and the three phase AC power Vu, Vv, Vw is supplied to the motor generator 4.

A configuration of the switching control apparatus 50 will be explained with referring to FIG. 1 and FIG. 2.

The switching control apparatus 50 includes a microcomputer or the like. The microcomputer includes a CPU, a ROM, an I/O, and a bus line that connect these components (all not shown). The switching control apparatus 50 executes software processing by executing a pre-stored program with the CPU or the switching control apparatus 50 executes hardware processing with a dedicated electronic circuit.

The switching control apparatus 50 receives a command torque trq* input from a superior vehicle control circuit or the like to the motor generator 4, an electrical angle θ and the electrical angle rate ω of the motor generator 4. Incidentally, the electrical angle rate ω (rad/s) may be calculated in the inside of the switching control apparatus 50 and, in addition, may be converted to a rotation rate N (rpm).

As a basic configuration, the switching control apparatus 50 includes a control circuit to the boost converter 20 and a drive circuit to the boost converter 20 and includes a control circuit to the inverter 30 and a drive circuit to the inverter 30. The control circuit to the boost converter 20 may be referred to as a boost converter control circuit 51, and the drive circuit to the boost converter 20 may be referred to as a boost converter drive circuit 54. The control circuit to the inverter 30 may be referred to as an inverter control circuit 61, and the drive circuit to the inverter 30 may be referred to as an inverter drive circuit 64. The boost converter control circuit 51 may correspond to a DC voltage converter control circuit. The boost converter drive circuit 54 may correspond to a DC voltage converter drive circuit. The inverter control circuit 61 may correspond to a power transducer control circuit. The inverter drive circuit 64 may correspond to a power transducer drive circuit.

The switching control apparatus 50 includes a switching prohibition period calculation portion 52 and a boost converter switching correction portion 53. The boost convert switching correction portion 53 may correspond to a DC voltage converter switching correction portion.

The boost converter control circuit 51 calculates control amount of the boost converter 20 based on a command voltage VHcom to the output voltage VH of the boost converter 20. The boost converter drive circuit 54 generates a drive signal Sc based on control amount of the boost converter 20, which is calculated by the boost converter control circuit 51. The boost converter drive circuit 54 performs ON/OFF operation of the upper and lower arm switching elements 23, 24 alternately.

The boost converter control circuit 51 in the present embodiment calculates a duty ratio as the control amount of the boost converter 20. The duty ratio corresponds to an ON/OFF time ratio to a switching cycle. The boost converter drive circuit 54 compares the duty ratio with a triangle wave carrier and generates a PWM signal.

In the following, a command value of ON time ratio (ON-duty) to the switching cycle of the high potential switching element 23 is defined as "duty". When a dead time is ignored, an ON-duty of the low potential switching element 24 corresponds to an OFF-duty of the high potential switching element 23, and corresponds to 1-duty. Incidentally, the duty may be generally used with a unit of % in a certain case. However, in the present explanation, the duty is defined as dimensionless number, which is zero to one.

The inverter control circuit 61 calculates control amount of the inverter 30 based on the command torque trq* to the motor generator 4. The inverter drive circuit 64 generates a drive signal Si based on the control amount of the inverter 30, which is calculated by the inverter control circuit 61. The inverter drive circuit 64 performs ON/OFF operation of the upper and lower arm switching elements 31-36 in each phase alternately.

The inverter control circuit 61 in the present embodiment calculates a duty ratio in each phase based from phase voltage command value in each phase as control amount of the inverter 30. The inverter drive circuit 64 compares the each phase duty ratio with a triangle wave carrier and generates a PWM signal.

In the following, a command value of ON time ratio (ON-duty) to the switching cycle of the high potential switching elements 31, 32, 33 in each phase is defined as "duty". When a dead time is ignored, an ON-duty of the low potential switching elements 34, 35, 36 in each phase corresponds to 1-duty to the duty of the corresponding high potential switching element.

Therefore, when the phase of "duty" is described in the present embodiments, the duty means the ON-duty command value of a high potential switching element in the boost converter 20 or the inverter 30. When the duty of the boost converter 20 is especially distinguished from the duty of the inverter 30, the duty of the boost converter 20 is described as CNV-duty and the duty of the inverter 30 in each phase is described as INV-duty. Incidentally, when it is obvious that which duty is mentioned according to the context, it is simply described as the duty.

Figure 2:
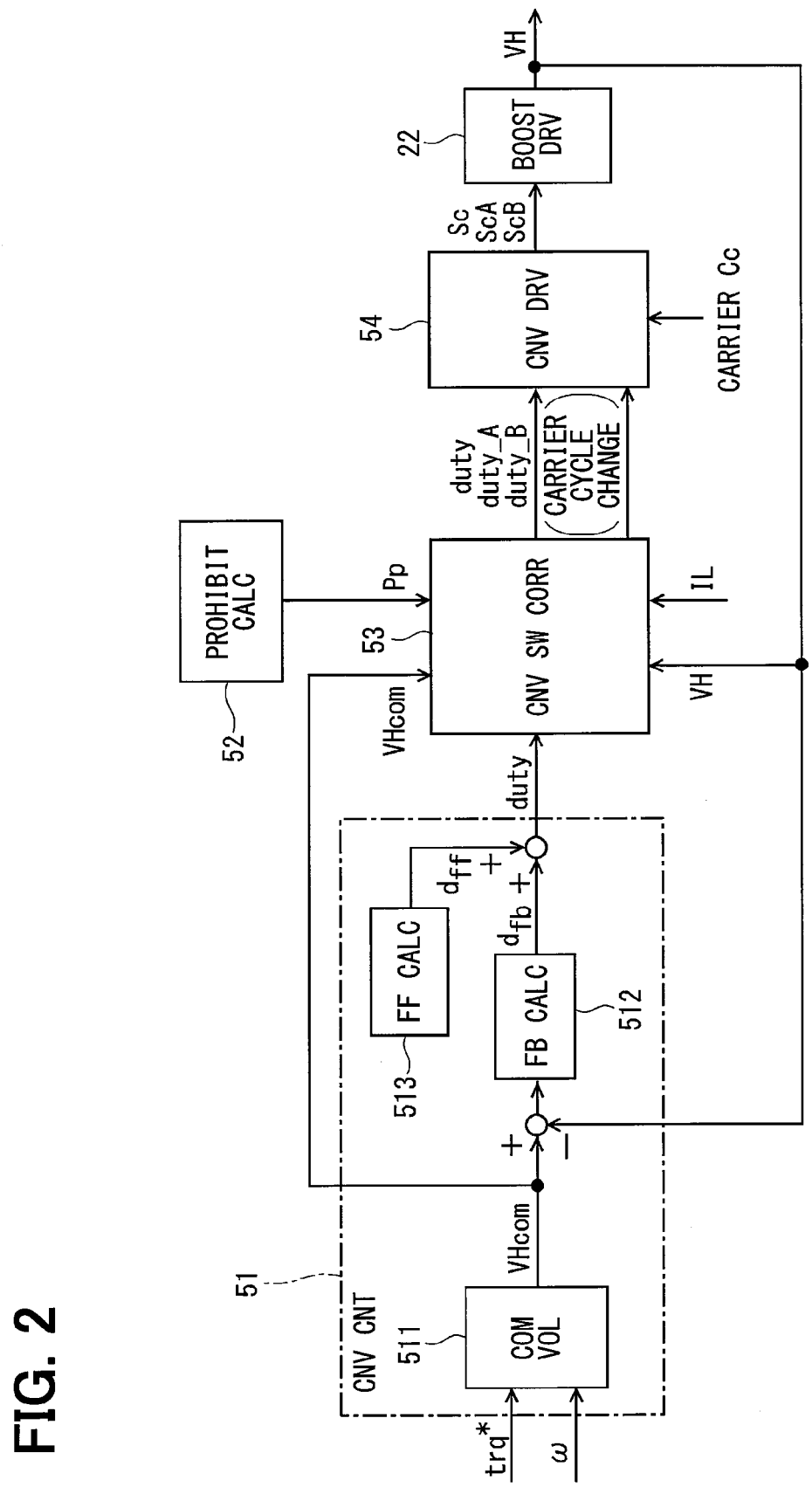
FIG. 2 is a block diagram schematically illustrating a control configuration with respect to a switching timing of a boost converter in the switching control apparatus in FIG. 1.

FIG. 2 illustrates a general configuration of the boost converter control circuit 51. The boost converter control circuit 51 includes a command voltage generation portion 511, a feedback calculation portion 512, and a feed forward calculation portion 513.

The command voltage generation portion 511 calculates a command voltage Vcom based on the command torque trq* and the electric angle rate ω. The feedback calculation portion 512 calculates a feedback term dfb of the duty by PI calculation so that a deviation between the command voltage Vcom and the output voltage VH is converged to zero. The feed forward calculation portion 513 calculates a feed forward term dff of the duty. The boost converter control circuit 51 outputs the duty obtained by adding the feedback term dfb and the feed forward term dff.

As the inverter control circuit 61, a current feedback control system, a torque feedback control system or the line are known. In the current feedback control system, a control is performed so that a current deviation between command current and actual current is converged to zero using a dq axis current vector. In the torque feedback control system, a control is performed so that a torque deviation between command torque and actual torque is converged to zero. In these control system, the duty in each phase calculated based in the phase voltage command value in each phase is output. A configuration of the inverter control circuit 61 is a well-known art, and a detailed explanation will be omitted.

A function of the switching prohibition period calculation portion 52 and the boost converter switching correction portion 53 will be explained with referring to a timing chart in FIG. 3.

The timing chart in FIG. 3 illustrates a relationship between the drive signal Si of the high potential switching element in one of the phases in the inverter 30 and the drive signal Sc in the high potential switching element 23 in the boost converter 20. More specifically, the timing chart in FIG. 3 illustrates an inverter carrier Ci, the inverter drive signal Si, a converter carrier Cc, and the converter drive signal Sc from top to bottom in an upright position.

Incidentally, the index of "i" illustrates an inverter and the index of "c" illustrates a boost converter. Hereinafter, the boost converter may also be referred to as a converter for simplicity. In addition, a phrase of "a switching timing of a switching element in a boost converter" may be abbreviated to a phrase of "a switching timing of a boost converter". A phrase of "a switching timing of a switching element in one of the phases in an inverter" may be abbreviated to a phrase of "a switching timing of an inverter" for simplicity.

A case where the drive signals Si, Sc are in an ON state means that a high potential switching element is in an ON state and a low potential switching element is in an OFF state. A case where the drive signals Si, Sc are in an OFF state means that the high potential switching element is in the OFF state and the low potential switching element is in the ON state. Thus, it is supposed that the dead time is ignored, and the drive signals Si, Sc illustrate an operation status of a switching element pair. Incidentally, in the switching element pair, a high potential switching element and a low potential switching element are paired with each other.

In the following timing charts, it is defined that the drive signals Si, Sc are turned into the ON state when the duty exceeds the carriers Ci, Cc. It is defined that the drive signals Si, Sc are turned into the OFF state when the duty falls below the carriers Ci, Cc. Thus, the drive signals Si, Sc change from the OFF state to the ON state while the carriers Ci, Cc fall down from a crest to a valley. The drive signals Si, Sc change from the ON state to the OFF state while the carriers Ci, Cc rise up from a valley to a crest. For example, the drive signal Sc in the boost converter 20 rises up between a time point tc1 and a time point tc2 in FIG. 3.

This rule in FIG. 3 will be applied to other timing charts.

As described in FIG. 3, the inverter control circuit 61 and the boost control circuit 51 obtains the latest control information for each crest and each valley of each of the carriers Ci, Cc, performs control calculation, and determines a next duty. The determined next duty is set to the inverter drive circuit 64 and the boost converter drive circuit 54, so that the next duty is reflected as a crest and valley in each of the carriers Ci, Cc in the next time. Incidentally, the inverter control circuit 61 and the boost converter control circuit 51 operate independently.

Since current sharply increases or decreases when the switching element performs a switching operation, surge voltage ($V=-L \times dI/dt$) occurs. The surge voltages are superposed and enlarged and a superposition surge may occur when multiple switching timings of multiple switching elements are adjacent with each other. In this case, a switching element may become malfunction when the superposition surge exceeds a withstand voltage of a switching element.

A symbol of "tsw" in FIG. 3 illustrates a switching timing when a rise up of the inverter drive signal Si is overlapped with a rise up of the converter drive signal Sc among multiple switching timings of the drive signal. A timing of δa is set before the switching timing tsw, and a timing of δb is set after the switching timing tsw. A switching prohibition period Pp is set between the δa and the δb including the switching timing tsw by illustrating with a frame indicated by a dashed line. The δa and the δb may be set so as to ensure a time for attenuation to an extent so that surge voltage does not affect each switching element by considering magnitude of estimated surge voltage and characteristic variation in each switching element. The switching timing tsw may be corrected to the outside of the switching prohibition period Pp in advance when it is assumed that the switching timings of the boost converter 20 and the inverter 30 are included in the switching prohibition period Pp.

Conventionally, a technology (for example, Japanese Patent No. 4428386 corresponding to US 2006/0250728 A1) to avoid an overlap of a switching timing of switching elements in each phase in an inverter is known. A technology (for example, patent literature 1) to avoid an overlap of a switching timing of switching elements between a boost converter and an inverter is known.

In the present disclosure, the switching prohibition period calculation portion 52 in the switching control apparatus 50 in the first to third embodiments calculates a switching prohibition period Pp, which prohibits a switching of the switching elements 23, 24 in the boost converter 20 over a predetermined period synchronized with a switching timing of a switching element pair in either phase prior to the switching timing of the switching element pair in either phase configuring the inverter 30. For example, in a case where a next INV-duty is control-calculated at a valley timing ti0 of the inverter carrier Ci, the switching prohibition period calculation portion 52 calculates the switching prohibition period Pp based on the determined INV-duty after a completion timing ti* of a control calculation before the next crest timing ti1 as described in FIG. 3.

The boost converter switching correction portion 53 executes correction processing by considering a switching timing of the boost converter 20 as a correction object switching timing tsw when it is predicted that the switching timing of the boost converter 20 is included in the switching prohibition period Pp. For example, in a case where a control operation of the boost converter 20 is performed at a valley timing ti0 of the converter carrier Ci, the boost converter switching correction portion 53 determines whether the next switching timing is included in the switching prohibition period Pp at a completion timing tc* of the control calculation. The boost converter switching correction portion 53 executes the correction processing when it is predicted that the switching timing is included in the switching prohibition period Pp.

A feature of the switching control apparatus 50 in the first to third embodiments according to the present disclosure will be explained.

The conventional technology in patent literature 1 corrects and delays a switching timing of an inverter to a completion timing of a predetermined switching prohibition period. Therefore, according to a relationship between the switching timings of a boost converter and an inverter, the switching timing of the inverter may be delayed largely. In this case, a controllability of a switching control apparatus may be reduced.

The boost converter switching correction portion 53 in the switching control apparatus 50 in the first to third embodiments according to the present disclosure determines which direction the correction object switching timing tsw is corrected to, and corrects the correction object switching timing tsw to the determined correction direction. Incidentally, the correction direction of the correction object a switching timing tsw corresponds to a forward direction and a backward direction. The forward direction means that the correction object switching timing tsw is shifted to an initiation timing of the switching prohibition period or is advanced to the initiation timing. The backward direction means that the correction object switching timing tsw is shifted to an end timing of the switching prohibition period or is delayed to the end timing.

That is, the switching control apparatus 50 in the first to third embodiments in the present disclosure corrects the switching timing of the boost converter 20 instead of correcting the switching timing of the inverter 30 basically. The correction of the correction object switching timing tsw is not limited to the backward direction, and it is determined the switching timing tsw should be corrected to the forward direction or the backward direction in each time.

This correction direction determination processing is initiated, for example, at the completion timing tc* when the control calculation by the converter is completed. Basically, a correction direction is determined so that a variation of a controllability generated by correction is minimized, and a reduction of the controllability of the switching control apparatus may be prevented.

As described in FIG. 2, the boost converter switching correction portion 53 receives various information including the command voltage VHcom, the output voltage VH, the reactor current IL or the like, in addition to the switching prohibition period Pp transmitted from the switching prohibition period calculation portion 52. The boost converter switching correction portion 53 corrects the duty, which is output from the boost converter control circuit 51.

The boost converter switching correction portion 53 may just output the duty before correction to the boost converter drive circuit 54 in some cases. The boost converter switching correction portion 53 may output a duty_A or a duty_B after correction in some cases.

The boost converter drive circuit 54 compares the duty (the duty_A and the duty_B) with the carrier Cc and outputs the drive signal Sc (ScA and ScB) to the boost drive portion 22.

A detail of this processing will be explained in each embodiment. A carrier frequency change, which is described in a bracket between the boost converter switching correction portion 53 and the boost converter circuit 54, will be described later.

In the following, a specific configuration of the correction direction determination processing will be explained in each embodiment.

First Embodiment

The correction direction determination processing in the first embodiment will be explained with referring to the timing chart in FIG. 4 and flowcharts in FIG. 5 and FIG. 6.

Figure 4:
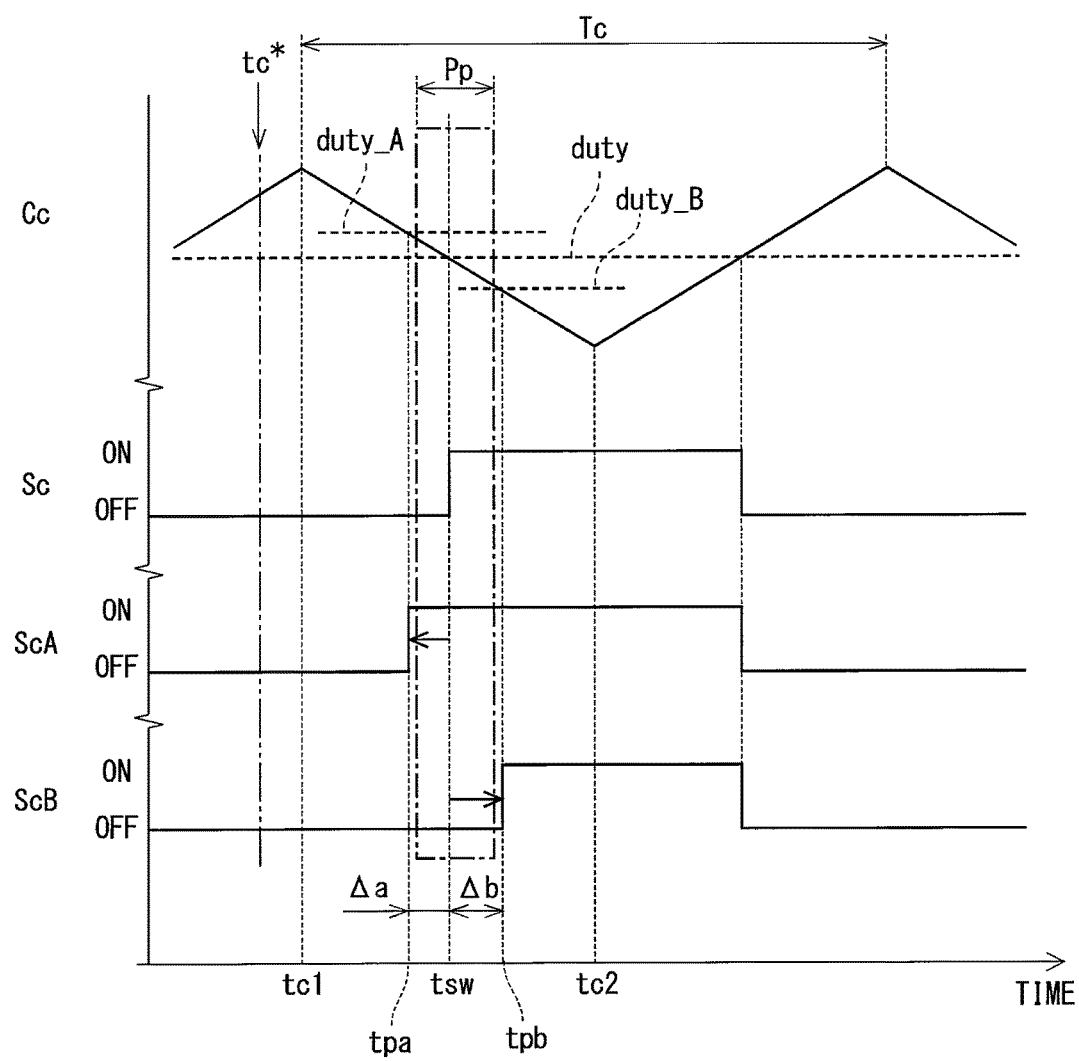
FIG. 4 is a timing chart illustrating a correction of a switching timing of a boost converter according to the first embodiment in the present disclosure.

FIG. 4 is a drawing especially illustrating the carrier Cc and the drive signal Sc of the boost converter 20 in FIG. 3. At the correction processing initiation timing tc* in FIG. 4, the switching control apparatus 50 predicts that the rise-up timing of the next drive signal Sc is included in the switching prohibition period Pp and corresponds to a correction object switching timing tsw. The correction object switching timing tsw may also be referred to as the switching timing tsw of the correction object.

In this step, the boost converter switching correction portion 53 may determine that the correction object switching timing tsw should be corrected to an initiation timing tpa of the switching prohibition period Pp, or may determine that the switching timing tsw should be corrected to an end timing tpb of the switching prohibition period Pp. Hereinafter, the initiation timing tpa of the switching prohibition period Pp may be referred to as a switching prohibition initiation timing, and the end timing tpb of the switching prohibition period Pp may be referred to as a switching prohibition end timing. Incidentally, a case where the switching timing tsw is corrected to the initiation timing tps may be referred to as a move-up correction, and a case where the switching timing tsw is corrected to the end timing tpb may be referred to as a set-back correction.

A drive signal ScA is defined as a drive signal when the move-up correction is performed (that is, the correction object switching timing tsw is corrected to the switching prohibition initiation timing tpa). A drive signal ScB is defined as a drive signal when the set-back correction is performed (that is, the switching timing tsw of the correction object is corrected to the switching prohibition end timing tpb).

In the first to third embodiments, generally, a correction of the switching timing tsw of the boost converter 20 is performed by changing the duty. That is, the switching timing tsw is advanced to the switching prohibition initiation timing tpa when the duty before correction is increased and changed to the duty_A. The switching timing tsw is delayed to the switching prohibition end timing tpb when the duty before correction is reduced and changed to the duty_B.

In the timing chart in FIG. 4 and the following drawings, since a frame border of the switching prohibition period Pp and the rise-up or fall-down line of the drive signals ScA, ScB may become hard to distinguish each other when the frame border and the lines are overlapped, the frame border and the rise-up or fall-down lines are slightly displaced.

Incidentally, a concept of the switching prohibition initiation timing tpa is not limited to a just moment when the switching prohibition period Pp initiates, and includes a period of time having a predetermined length before the initiation timing, which is appropriately set when an immediate before the initiation timing is targeted in this technical field. Similarly, a concept of the switching prohibition end timing tpb is not limited to a moment when the switching prohibition period Pp ends, and includes a period of time having a predetermined length after the initiation timing, which is appropriately set when an immediate after the end timing is targeted in this technical field.

In the first embodiment, a correction time of a switching timing will be focused on. The correction time of the switching timing means a length of time corresponding to a shifted time of the switching timing tsw by correction.

A forward correction time $\Delta a$ that advances the correction object switching timing tsw to the switching prohibition initiation timing tpa is defined as the following:

$\Delta a$=(the switching timing *tsw*)−(the switching prohibition initiation timing *tpa*).

A backward correction time $\Delta b$ that sets back the correction object switching timing tsw to the switching prohibition end timing tpb is defined as the following:

$\Delta b$=(the switching prohibition end timing *tpb*)−(the switching timing *tsw*).

Figure 5:
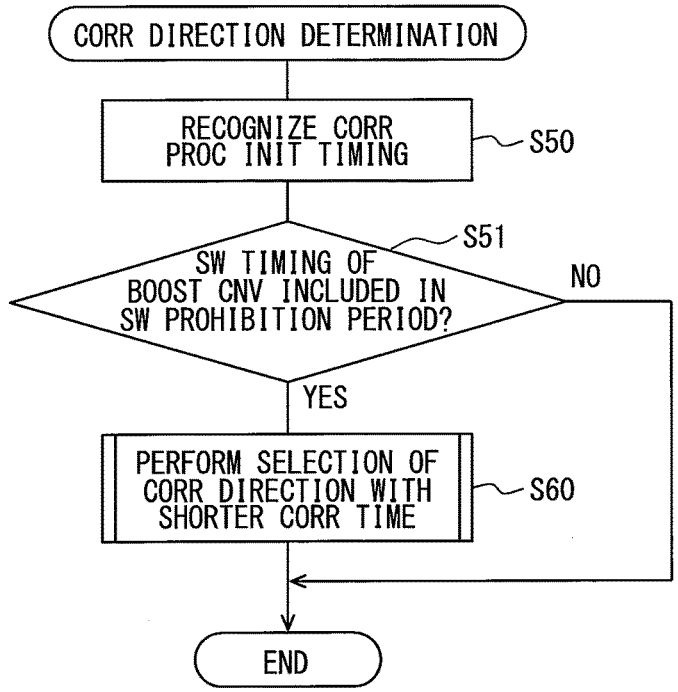
FIG. 5 is a flowchart illustrating correction direction determination processing according to the first embodiment in the present disclosure.
Figure 6:
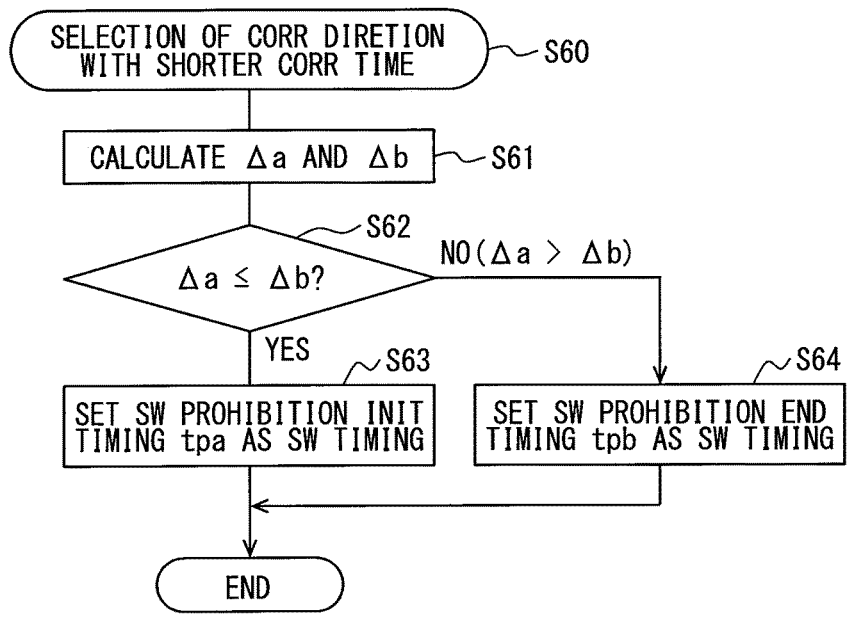
FIG. 6 is a flowchart illustrating a step of S60 in FIG. 5.

The flowcharts in FIG. 5 and FIG. 6 will be referred. In the following explanation, a symbol of "S" means a step or a section. It is noted that a flowchart or a processing of the flowchart in the present application includes steps (also referred to as sections), each of which is represented, for example, as S50. Further, each step may be divided into several sub-step, and several steps may be combined into a single step.

At S50, the correction direction determination processing is initiated at the correction processing initiation timing tc*.

When the correction direction determination processing is initiated, it is determined at S51 whether a switching timing tsw that occurs in a period between the next crest timing tc1 and the next valley timing tc2 of the converter carrier Cc is included in the switching prohibition period Pp.

The processing shifts to S60 when S51 corresponds to YES. The processing ends when S51 corresponds to NO.

A sub flow of a step at S60 is illustrated in FIG. 6. The step corresponding to S60 selects a correction direction that a correction time is shorter than another correction direction. That is, the step of S60 selects a correction direction having a shorter correction time.

The switching control apparatus 50 calculates the forward correction time $\Delta a$ and the backward correction time $\Delta b$ at S61.

The switching control apparatus 50 compares the forward correction time $\Delta a$ with the backward correction time $\Delta b$ at S62.

When the forward correction time $\Delta a$ is equal to or less than the backward correction time $\Delta b$ (S62: YES), the switching timing tsw is set to the switching prohibition initiation timing tpa (S63). When the forward correction time $\Delta a$ is longer than the backward correction time $\Delta b$ (S62: NO), the switching timing tsw is set to the switching prohibition end timing tpb (S64).

Incidentally, a case where the forward correction time $\Delta a$ is equal to the backward correction time $\Delta b$ with accuracy of a minimum resolution of the control apparatus may be ignored practically. Thus, a case where the forward correction time $\Delta a$ is equal to the backward correction time $\Delta b$ may be included to either YES or NO at S62.

In the first embodiment, the correction object switching timing tsw is corrected to the correction direction having a shorter correction time, and therefore, it may be possible to minimize variation of ON/OFF time of the switching element before and after the correction. Therefore, it may be possible to avoid occurrence of superposition surge and to prevent a reduction of a controllability of the switching control apparatus 50 as much as possible.

Second Embodiment

The correction direction determination processing in the second embodiment will be explained with referring to the timing chart in FIG. 7A, FIG. 7B, FIG. 8A and FIG. 8B and flowcharts in FIG. 9. In the second embodiment, the switching control apparatus 50 determines a correction direction based on a switching direction and a positive/negative polarity of the reactor current IL. Incidentally, the switching direction illustrates the correction object switching timing tsw corresponds to a rise-up direction or a fall-down direction of the drive signal Sc. Alternatively, the switching control apparatus 50 determines the correction direction based on a relationship between the switching direction of the correction object switching timing tsw, the output voltage VH output from the boost converter 20, and the command voltage VHcom.

The correction direction determination processing based on the reactor current IL will be explained. The reactor current IL may be detected by a current sensor provided to the inside of the boost converter 20 or may be estimated by an expression 1 described in FIG. 16.

A symbol and a unit described in a bracket in the expression 1 will be described in the following:

IL_est (A) corresponding to a (estimated) reactor current;

Nm (1/s) corresponding to a rotation speed of the motor generator 4;

trq (V×A×s) corresponding to torque of the motor generator 4;

L (V×s/A) corresponding to an inductance of the reactor 21; and

Toff (s) corresponding to an OFF time of the high potential switching element 23 (corresponding to the ON time of the low potential switching element 24).

The symbol of "L" corresponds to a circuit constant of the boost converter 20 (a DC voltage converter). The symbols of "Nm" and "trq" correspond to behavioral information of the motor generator 4.

The boost converter switching correction portion 53 obtains a detection value or an estimation value of the reactor IL, and obtains a variation status.

As described in FIG. 7A, FIG. 7B, FIG. 8A and FIG. 8B, the reactor current IL gradually decreases while the drive signal Sc is in the ON state, that is, while the high potential switching element 23 is in the ON state. The reactor current IL gradually increases while the drive signal Sc is in the OFF state, that is, while the low potential switching element 24 is in the ON state. The reactor current IL has a maximal value when the drive signal Sc is changed from the OFF state to the ON state and initiates to rise up. The reactor current IL has a minimum value when the drive signal Sc is changed from the ON state to the OFF state and initiates to fall down.

When the motor generator 4 performs a powering operation, the reactor current IL flows from a side of the battery 15 to a side of the inverter 30 and a sign of the reactor current IL corresponds to a positive polarity. When the motor generator 4 performs a regenerative operation, the reactor current IL flows from the side of the inverter 30 to the side of the battery 15 and a sign of the reactor current IL corresponds to a negative polarity. Alternatively, the signs of the reactor current IL may be determined based on information of torque and rotation speed of the motor generator 4.

A correction of the switching timing may be performed so that excessive current does not flow through the reactor 21. That is, an absolute value of the reactor current IL may decrease, and the absolute value of the reactor current IL may approach zero. As described in table 1 in FIG. 17, a correction direction is determined according to combinations of a rise-up/fall-down of the drive signal Sc and the positive/negative polarity of the reactor current IL, that is, according to a condition where the motor generator 4 is in the powering operation or the regenerative operation.

A correction of the rise-up timing of the drive signal Sc will be explained with referring to the upper column in table 1 in FIG. 17, FIG. 7A, and FIG. 7B. In the reactor current IL in FIG. 7A and FIG. 7B, current before correction is illustrated by a two-dot chain line, and current after correction is illustrated by a solid line.

Figure 7A:
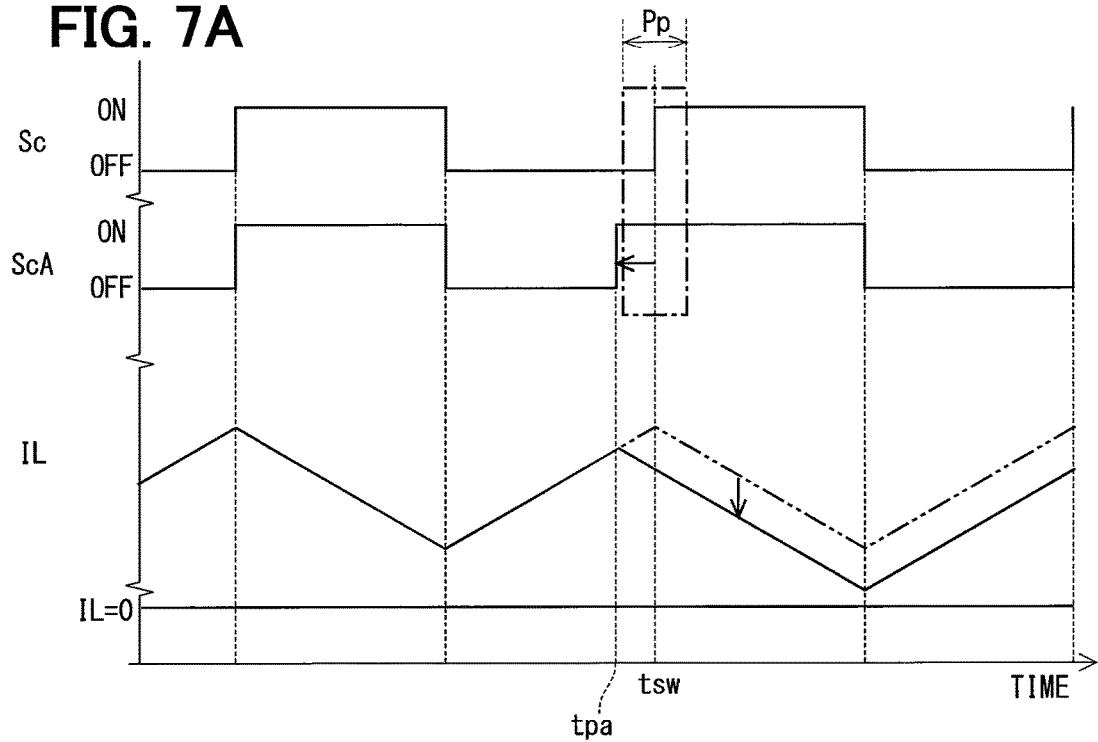
FIG. 7A is a timing chart illustrating correction direction determination processing according to the second embodiment and illustrating a case where a rise-up timing of the boost converter drive signal is corrected.
Figure 7B:
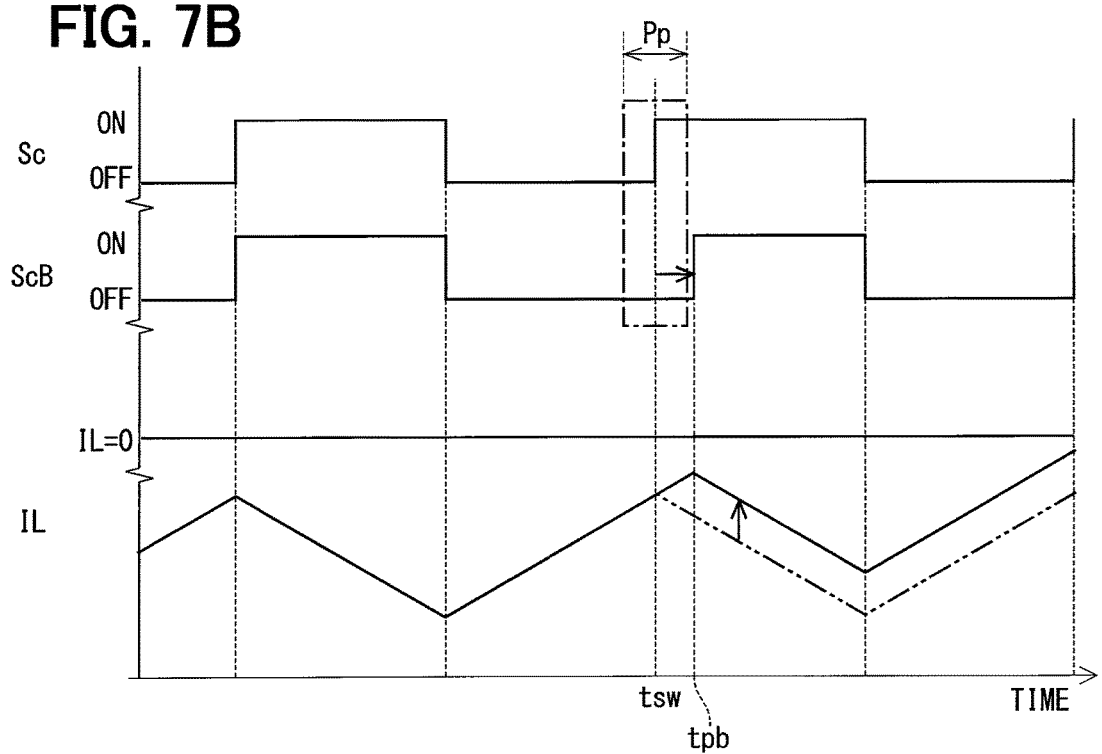
FIG. 7B is a timing chart illustrating correction direction determination processing according to the second embodiment and illustrating a case where a rise-up timing of the boost converter drive signal is corrected.

As described in FIG. 7A, when the reactor current IL corresponds to a positive polarity, the switching timing tsw is advanced to the switching prohibition initiation timing tpa, and the reactor current IL is corrected toward a direction approaching zero. As described in FIG. 7B, when the reactor current IL corresponds to a negative polarity, the switching timing tsw is delayed to the switching prohibition end timing tpb, and the reactor current IL is corrected toward a direction approaching zero.

A correction of the fall-down timing of the drive signal Sc will be explained with referring to a lower column in table 1, FIG. 8A and FIG. 8B. In the reactor current IL in FIG. 8A and FIG. 8B, current before correction is illustrated by a two-dot chain line, and current after correction is illustrated by a solid line.

Figure 8A:
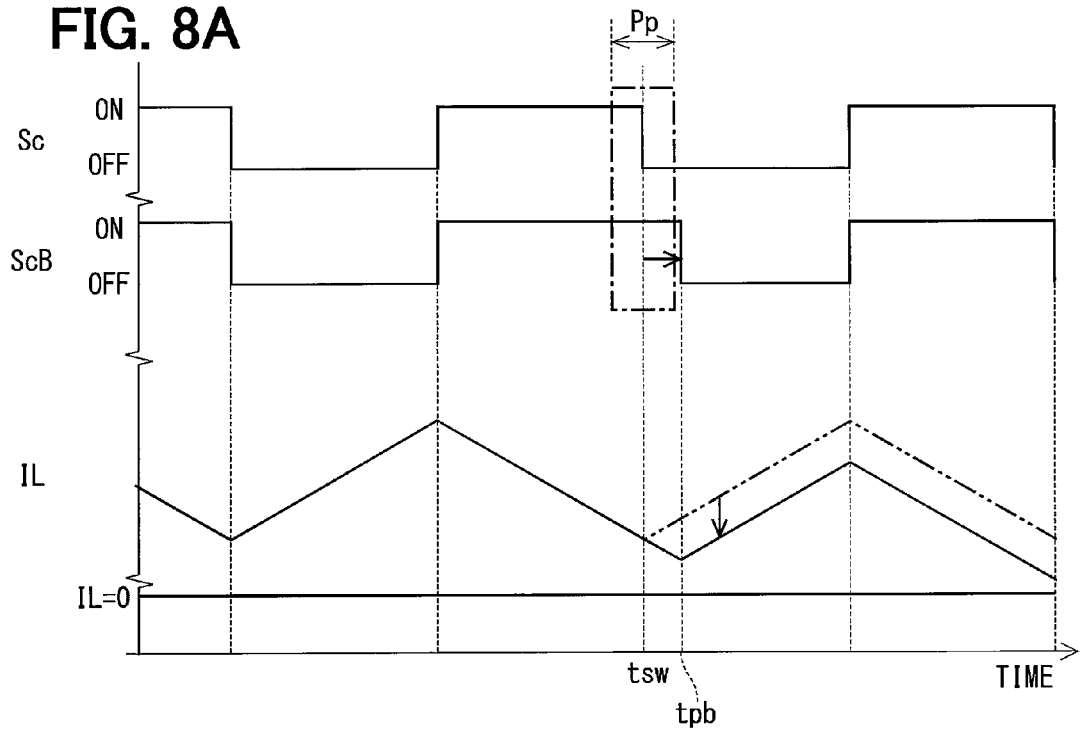
FIG. 8A is a timing chart illustrating correction direction determination processing according to the second embodiment and illustrating a case where a fall-down timing of the boost converter drive signal is corrected.
Figure 8B:
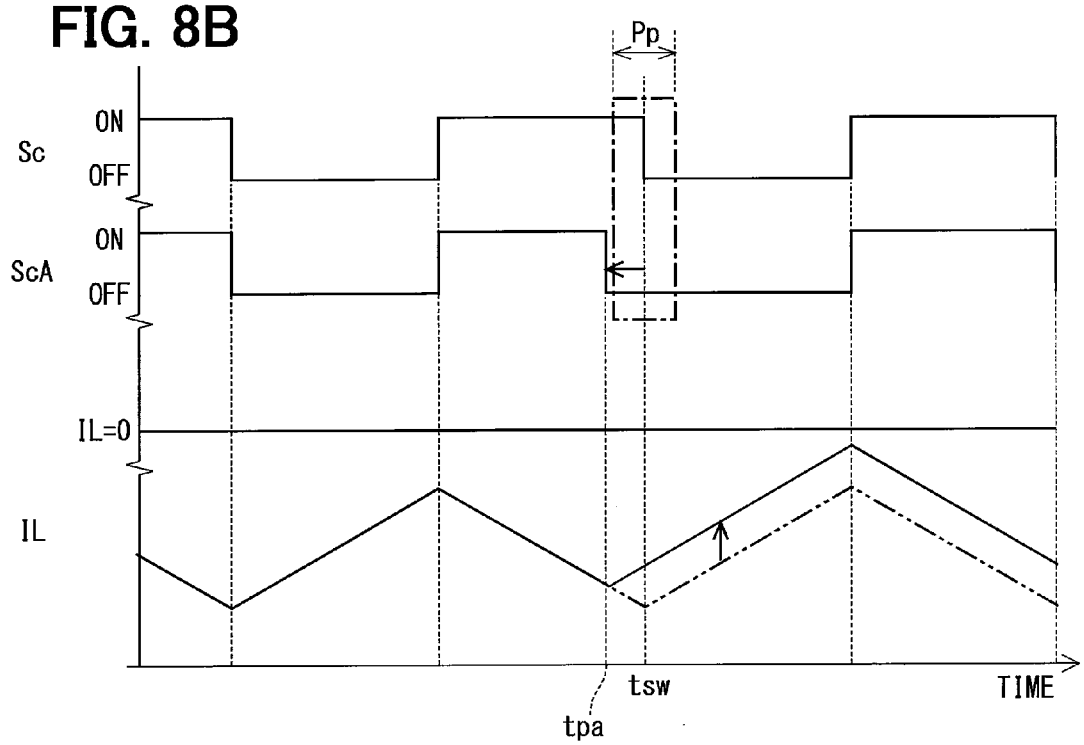
FIG. 8B is a timing chart illustrating correction direction determination processing according to the second embodiment and illustrating a case where a fall-down timing of the boost converter drive signal is corrected.

As described in FIG. 8A, when the reactor current IL corresponds to a positive polarity, the switching timing tsw is delayed to the switching prohibition end timing tpb, and the reactor current IL is corrected toward a direction approaching zero. As described in FIG. 8B, when the reactor current IL corresponds to a negative polarity, the switching timing tsw is advanced to the switching prohibition initiation timing tpa, and the reactor current IL is corrected toward a direction approaching zero.

The correction direction determination processing based on the output voltage VH of the boost converter 20 will be explained. In this case, the switching control apparatus 50 compares the output voltage VH and the command voltage VHcom, and corrects the output voltage VH so that the output voltage VH approaches the command voltage VHcom. In this case, as the ON time of the high potential switching element 23 is longer, the output voltage VH reduces. Therefore, the switching timing tsw may be corrected to shorten the ON time in order to increase the output voltage VH. The switching timing tsw may be corrected to elongate the ON time in order to reduce the output voltage VH. A correction direction is determined based on table 2 in FIG. 18 that illustrates cases divided similar to the reactor current IL.

With respect to a timing chart, drive signals ScA, ScB in a case of "IL>0" in FIG. 7A, FIG. 7B, FIG. 8A and FIG. 8B is employed to a case of "VH>VHcom". The drive signals ScA, ScB in a case of "IL<0" is employed to a case of "VH<VHcom".

As described in the upper column in table 2 in FIG. 18, it is supposed that the rise-up timing of the drive signal Sc is corrected. In this case, when the output voltage VH is larger than the command voltage VHcom, the switching timing tsw is advanced to the switching prohibition initiation timing tpa. The output voltage VH is corrected to decrease. It is supposed that the output voltage VH is less than the command voltage VHcom. In this case, the switching timing tsw is delayed to the switching prohibition end timing tpb, and the output voltage VH is corrected to increase.

As described in the lower column in table 2, it is supposed that the fall-down timing of the drive signal Sc is corrected. In this case, when the output voltage VH is larger than the command voltage VHcom, the switching timing tsw is delayed to the switching prohibition end timing tpb. The output voltage VH is corrected to decrease. When the output voltage VH is less than the command voltage VHcom, the switching timing tsw is advanced to the switching prohibition initiation timing tpa, and the output voltage VH is corrected to increase.

Figure 9:
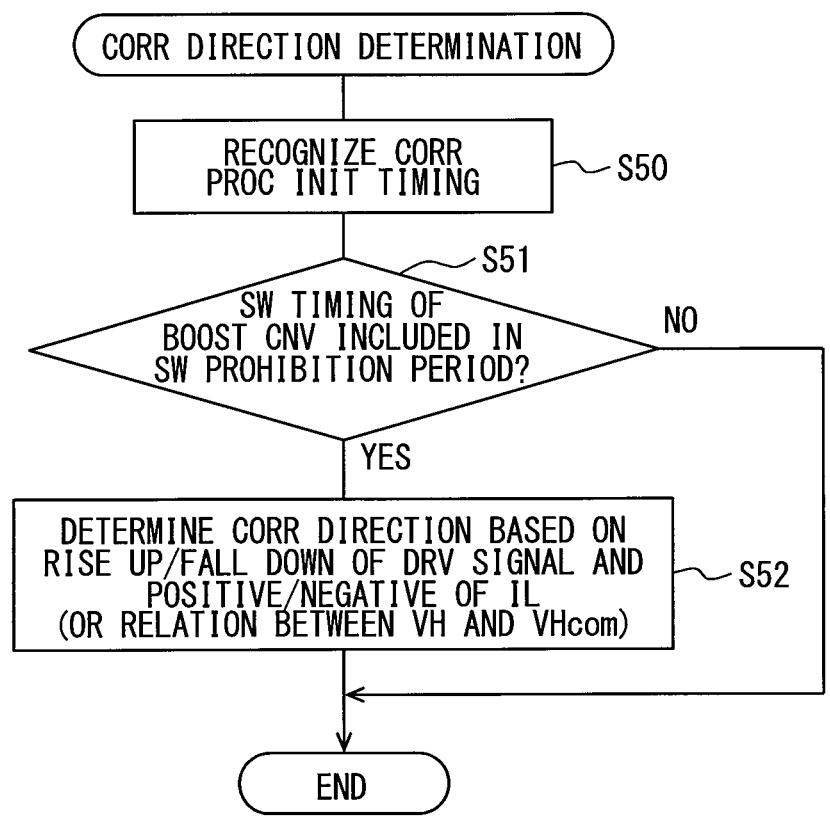
FIG. 9 is a flowchart illustrating the correction direction determination processing according to the second embodiment in the present disclosure.

In a flowchart in FIG. 9 illustrating a correction direction adjustment processing in the second embodiment, S50 and S51 are identical steps in FIG. 5 in the first embodiment. A correction processing of S52 performed when S51 corresponds to YES is different from the first embodiment.

At S52, a correction direction is determined based on a point whether the correction object switching timing tsw corresponds to the rise up or the fall down of the drive signal Sc and the positive/negative polarity of the reactor current IL flowing through the reactor 21 of the boost converter 20, or a relationship between the output voltage VH output from the boost converter 20 and the command voltage VHcom.

In the second embodiment, the correction object switching timing tsw is corrected so that an absolute value of the reactor current IL decreases or the output voltage VH approaches the command voltage VHcom. A feature of the boost converter 20 is kept in a preferable state. Therefore, it may be possible to avoid occurrence of superposition surge and to prevent a reduction of a controllability of the switching control apparatus 50 as much as possible.

Third Embodiment

The third embodiment in the present disclosure will be explained with referring to a timing chart in FIG. 10 and FIG. 11 and a flowchart in FIG. 12. In the third embodiment, a determination performed in the correction direction determination processing in the first embodiment or the second embodiment is referred to as a temporary determination. In the third embodiment, the boost converter switching correction portion 53 checks whether a correction direction determined temporarily is suitable or not. When the boost converter switching correction portion 53 determines that it is unsuitable, the correction direction is adjusted. Specifically, the boost converter switching correction portion 53 checks whether the correction direction is suitable by focusing on a switching timing interval. The switching timing interval corresponds to an interval between a switching timing before correction and a previous switching timing.

In FIG. 10, it is supposed that the switching timing tsw is temporarily determined to be corrected to the switching prohibition initiation timing tpa in a forward correction direction. In this case, an interval INT_A between the switching timing tpa after correction and a previous switching timing ts9 is shorter than a switching timing interval INT before correction. When the switching timing interval INT_A is too short, a minimum OFF time may not be ensured between the ON periods of the high potential switching element 23, a continuous energizing time may exceed a tolerance range, and a switching element may be heated.

In FIG. 11, it is supposed that the switching timing tsw is temporarily determined to be corrected to the switching prohibition end timing tpb in a backward correction direction. In this case, an interval INT_B between the switching timing tpb after correction and a previous switching timing ts9 is longer than the switching timing interval INT before correction. When the switching timing interval INT_B is too long, the ON state of the low potential switching element 24 may be kept for long time and the reactor current IL may be in an overcurrent state.

Thus, too long switching timing interval or too short switching timing interval may be unsuitable. In the third embodiment, a lower limit threshold α and an upper limit threshold β are provided. When the switching timing interval in the correction direction that is temporarily determined falls below the lower limit threshold α or when the switching timing interval in the correction direction that is temporarily determined exceeds the upper limit threshold β, the correction direction temporarily determined is adjusted to a correction direction opposite to the correction direction that is temporarily determined.

Figure 12:
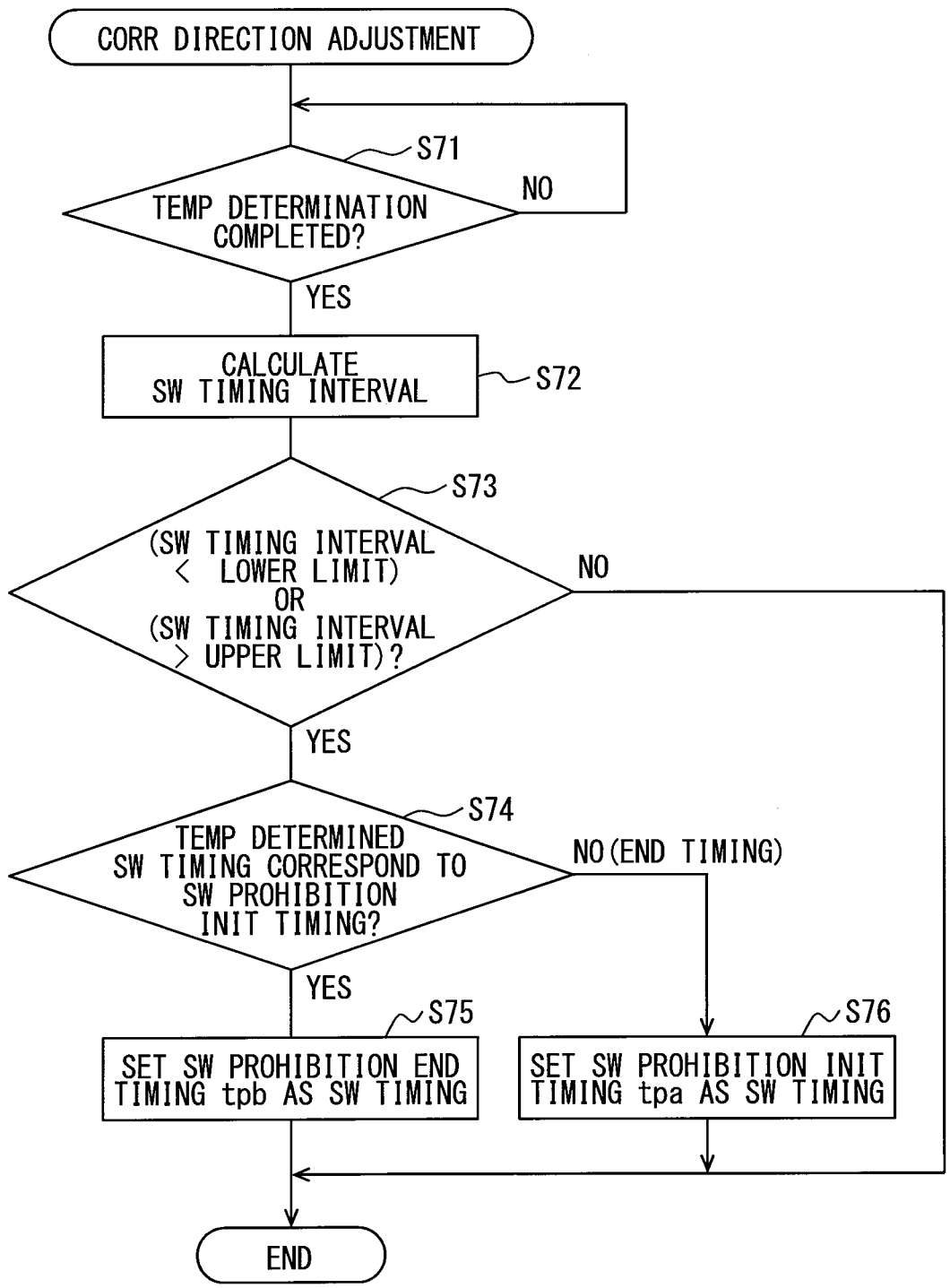
FIG. 12 is a flowchart illustrating the correction direction adjustment processing according to the third embodiment in the present disclosure.

When it is determined that the temporary determination of the correction direction is completed at S71 in FIG. 12 (S71: YES), the processing shifts to S72. At S72, the previous switching timing is subtracted from the switching timing after correction, and the switching timing interval is calculated.

At S73, the switching timing interval INT_A is compared with the lower limit threshold α or the switching timing interval INT_B is compared with the upper limit threshold β. When the switching timing interval INT_A is equal to or more than the lower limit threshold α or when the switching timing interval INT_B is equal to or less than the lower limit threshold β (S73: NO), it is determined that the correction direction temporarily determined is suitable and the processing completes.

When the switching timing interval INT_A is less than the lower limit threshold α or when the switching timing interval INT_B exceeds the upper limit threshold β (S73: YES), it is determined that the correction direction temporarily determined is unsuitable and the processing shifts to S74 to adjust the correction direction. At S74, the correction direction temporarily determined is adjusted.

As described in FIG. 10, when the correction direction temporarily determined of the switching timing tsw corresponds to the forward direction to the switching prohibition initiation timing tpa (S74: YES), the correction direction of the switching timing tsw is adjusted to the backward direction to the switching prohibition end timing tpb (S75).

As described in FIG. 11, when the correction direction temporarily determined of the switching timing tsw corresponds to the backward direction to the switching prohibition end timing tpb (S74: NO), the correction direction of the switching timing tsw is adjusted to the forward direction to the switching prohibition initiation timing tpa (S76).

Accordingly, in the third embodiment, it may be possible to prevent the switching element from heating and to prevent the reactor IL from being an overcurrent state.

Incidentally, it is not limited to the described procedure. Another procedure reversed to the above procedure may be applicable.

Initially, at the correction processing initiation timing, the switching timing interval INT_A obtained by correcting the switching timing to the switching prohibition initiation timing tpa and the switching timing interval INT_B obtained by correcting the switching timing to the switching prohibition end timing tpb are evaluated. When both or either of the switching timing intervals INT_A, INT_B is out of the ranges explained at S73, the correction direction is adjusted to another direction opposed to the correction direction.

When both of the switching timing intervals INT_A, INT_B are included in the ranges in S73, the processing shifts to the correction direction determination processing in the first and second embodiments, so that a more suitable correction direction is selected. According to this configuration, it may be possible to reduce a calculation, which is a useless calculation for a temporary determination that is not used eventually.

(Correction of Switching Timing in Inverter)

The switching control apparatus 50 in the first to third embodiments corrects the switching timing of the boost converter 20. A switching control apparatus 60 in the fourth and fifth embodiments corrects a switching timing in the inverter 30.

Figure 13:
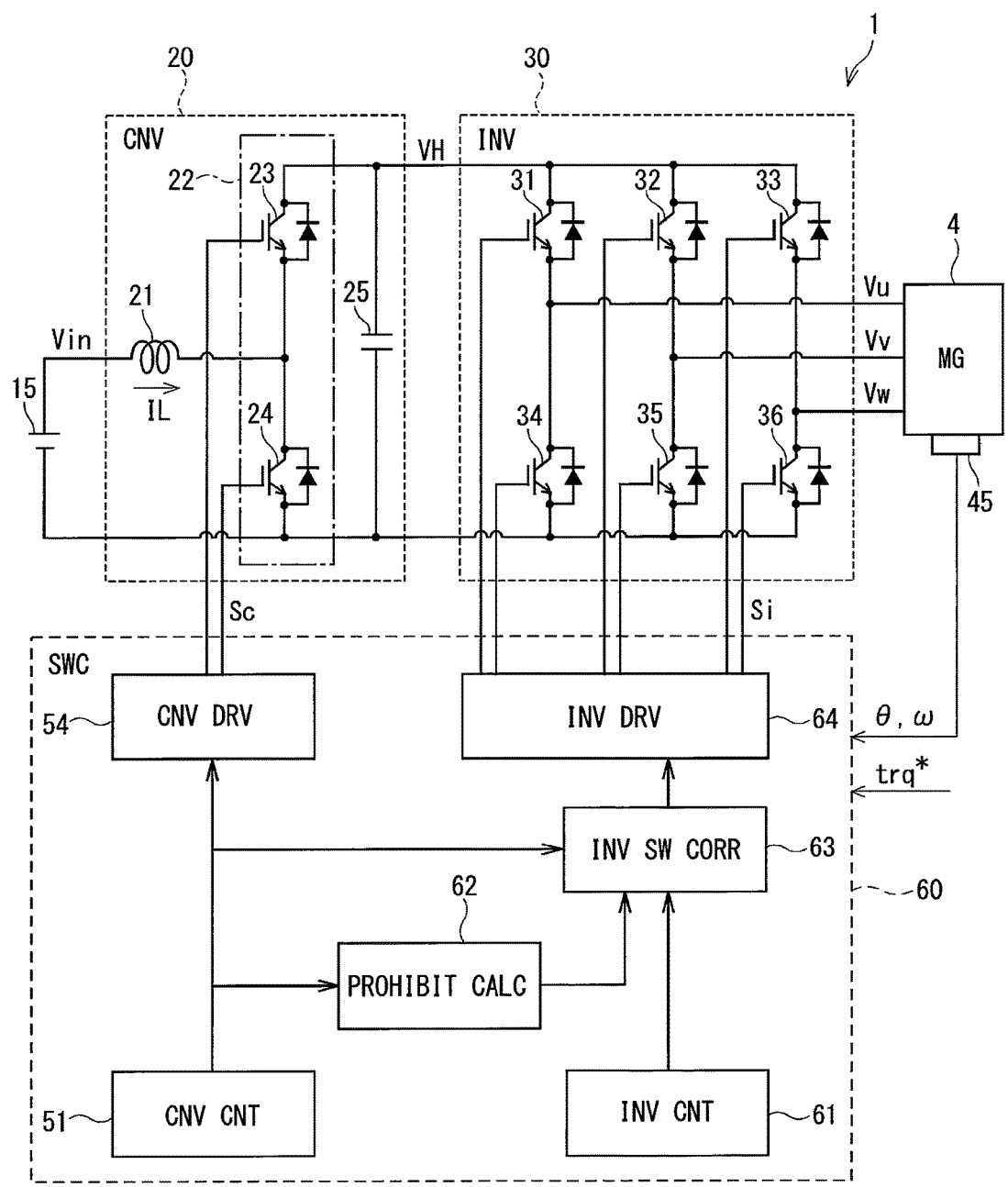

A configuration common in the fourth and fifth embodiments will be explained with referring to an overall configuration in FIG. 13. The switching control apparatus 60 described in FIG. 13 includes an inverter switching correction portion 63 instead of the boost converter switching correction portion 53 in FIG. 1. The inverter switching correction portion 63 corresponds to a power transducer switching correction portion. That is, control blocks of the inverter and the boost converter in FIG. 13 are in a reversed relation in control blocks of the inverter and the boost converter in FIG. 1. Incidentally, the boost converter switching correction portion 53 and the inverter switching correction portion 63 may correspond to a switching correction portion.

A switching prohibition period calculation portion 62 has a function that calculates the switching prohibition period Pp described in FIG. 3. The function of the switching prohibition period calculation portion 62 is similar to the switching prohibition period calculation portion 52 in FIG. 1. The switching prohibition period calculation portion 62 transmits information of the switching prohibition period Pp to an inverter switching correction portion 63. The symbol of the switching prohibition period calculation portion in the fourth and fifth embodiments corresponds to "62", which is different from the switching prohibition period calculation portion 52.

Figure 14:
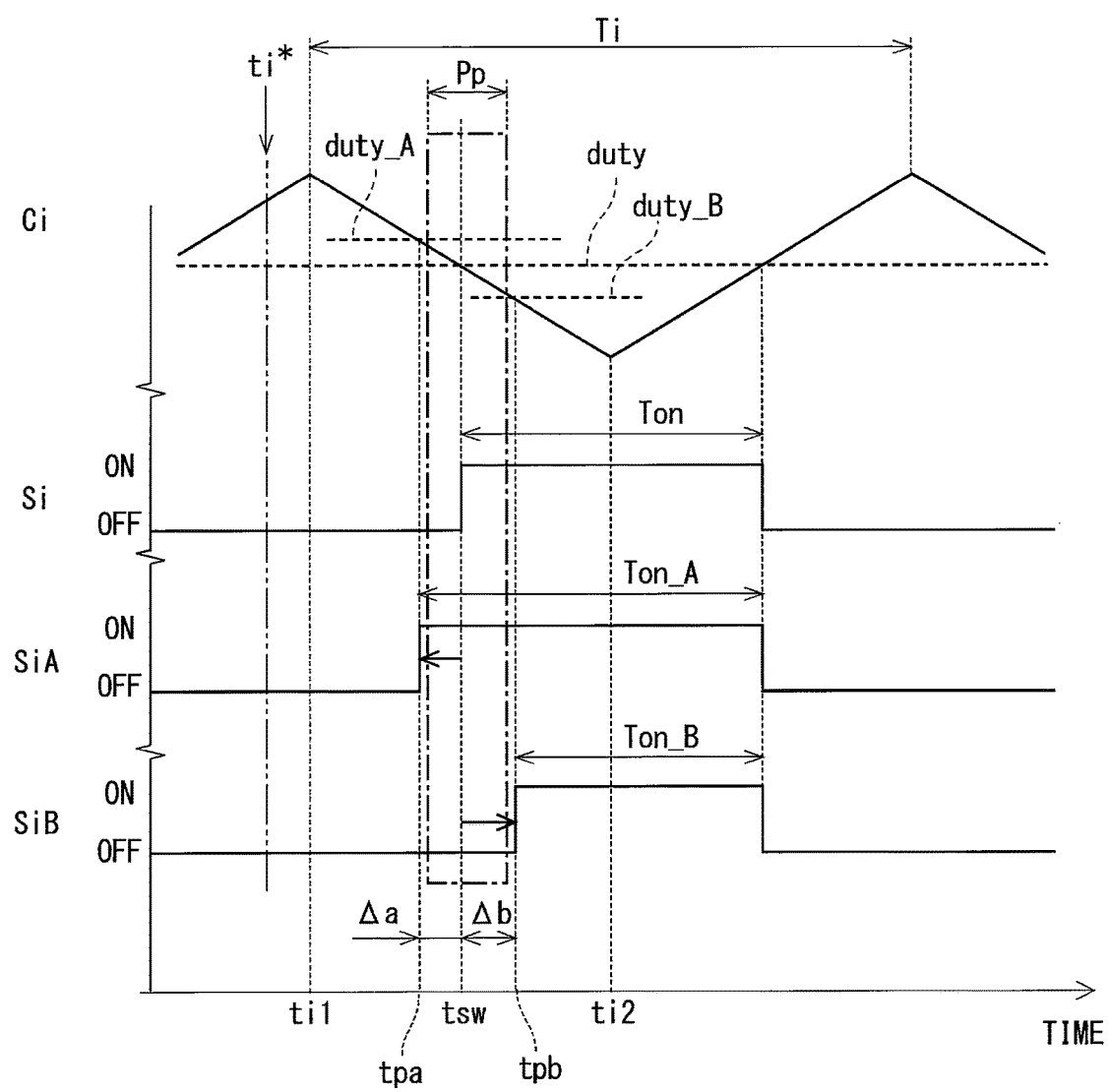
FIG. 14 is a timing chart illustrating a correction of a switching timing of an inverter according to the fourth embodiment in the present disclosure.

A timing chart in FIG. 14 corresponds to the timing chart in FIG. 4. The timing chart in FIG. 14 illustrates correction processing of switching timing of the inverter 30. When a three-phase AC inverter is supposed, the timing chart in FIG. 14 corresponds to each of the U-phase, the V-phase, and the W-phase.

The inverter drive signal Si is in the ON state when the duty exceeds the carrier Ci. The inverter drive signal Si is in the OFF state when the duty falls below the carrier Ci.

The switching prohibition period calculation portion 62 calculates the switching prohibition period Pp, which prohibits a switching of the switching elements 31-36 in the inverter 30 over a predetermined period synchronized with the switching timing before the switching timing of the switching elements 23, 24 in the boost converter 20.

When it is predicted that the switching timing in one or more phases falls within the switching prohibition period Pp, the inverter switching correction portion 63 sets the switching timing in the phase as the correction object switching timing tsw. The switching control apparatus 60 determines whether the correction object switching timing tsw is corrected to the switching prohibition initiation timing tpa in the forward direction or whether the correction object switching timing tsw is corrected to the switching prohibition end timing tpb in the backward direction. The switching control apparatus 60 corrects the correction object switching timing tsw to the determined correction direction.

The boost converter switching correction portion 63 basically changes the duty and corrects the switching timings tsw, similar to the first to third embodiments. That is, the switching timing tsw is advanced to the switching prohibition initiation timing tpa when the boost converter switching correction portion 63 changes the duty before correction to the duty_A. The switching timing tsw is delayed to the switching prohibition end timing tpb when the boost converter switching correction portion 63 changes the duty before correction to the duty_B.

In the following, a manner to determine the correction direction will be explained in each of the embodiments.

Fourth Embodiment

The fourth embodiment in the present disclosure will be explained with referring to the flowchart in FIG. 15. In the correction direction determination processing in the fourth embodiment, according to a predicted number of phases whose switching timing falls within the switching prohibition period Pp, processing are divided into cases.

It is determined that the processing reaches the correction processing initiation timing ti* at S80. It is determined whether the switching timings of one or more phases in the inverter 30 fall within the switching prohibition period Pp at S81. When the step of S81 corresponds to NO, the processing ends. When the step of S81 corresponds to YES, the processing shifts to S82 and S83 and the number of phases whose the switching timing tsw falls within the switching prohibition period Pp is determined.

When the number of phase whose switching timing tsw falls within the switching prohibition period Pp is equal to one (S82: YES), the step corresponding to S60 selects a correction direction whose correction time is shorter than another correction direction.

Accordingly, it may be possible to suppress variation of ON/OFF time of the switching element in each phase due to correction to a minimum. It may be possible to drive the motor generator 4 stably.

When the number of phases whose switching timing tsw falls within the switching prohibition period Pp is equal to two (for example, the U phase and the V phase) phases (S82: NO and S83: YES), there are four patterns in which the switching timing is advanced to the switching prohibition period initiation timing (A) or the switching timing is delayed to the switching prohibition period end timing (B) with respect to each of the phases. The four patterns are described in table 3 in FIG. 19.

When the number of phase whose switching timing tsw falls within the switching prohibition period Pp is equal to there (the U phase, the V phase, and the W phase) phases (S82: NO and S83: NO), there are eight patterns in which the switching timing is advanced to the switching prohibition period initiation timing (A) or the switching timing is delayed to the switching prohibition period end timing (B). The eight patterns are described in table 4 in FIG. 20.

In the fourth embodiment, an optimal combination is selected among the four patterns or the eight patterns. The optimal combination corresponds to a combination that minimizes a torque deviation between an estimated torque of the motor generator 4 that is estimated based on phase voltage after correction and the command torque. After selecting the optimal combination, the correction direction is determined. That is, the estimated torque is calculated at S84 or S85 in the flowchart, and then, a combination that minimizes the torque deviation is selected at S86.

Incidentally, the meaning of "(or 2)" and "(or 6)" at S84 and S85 in FIG. 15 will be explained in the fifth embodiment.

A specific procedure calculating the estimated torque at S84 or S85 will be explained.

(1) Initially, three-phase voltages Vu, Vu, Vw are calculated based on an ON time Ton_A or an ON time Ton_B after correction of the switching element in each phase. Incidentally, when the switching timing tsw in two phases falls within the switching prohibition period Pp, a phase voltage with respect to the other phase other than the two phases is calculated based on an ON time Ton before correction.

(2) A dq conversion of the three-phase voltages Vu, Vu, Vw is performed according to an expression 2 described in FIG. 21, so that dq-axis estimated voltages Vd, Vq are calculated. Incidentally, the symbol of θ (theta) corresponds to an electric angle detected by the rotation angle sensor 45.

(3) dq-axis estimated currents Id, Iq are calculated based on an expression 3.1 and an expression 3.2 described in FIG. 22A and FIG. 22B, which are obtained by modifying well-known voltage equations. The symbols in the expressions 3.1, 3.2 are as follows. The symbols of R, Ld, Lq, and φ correspond to a circuit constant of the motor generator 4 (a polyphase AC motor). The symbol of ω corresponds to behavior information of a polyphase AC motor. Incidentally, the inductances Ld, Lq correspond to a value including superposition characteristics.

The symbol of R corresponds to an armature winding resistance.

The symbols of Ld, Lq correspond to d-axis and q-axis inductances, respectively.

The symbol of ω corresponds to an electric angle rate.

The symbol of φ corresponds to a back electromotive force constant (an interlinkage magnetic flux).

(4) An estimated torque trq_est is calculated based on a well-known torque expression (expression 4 in FIG. 23) or a map. The symbol of P corresponds to the number of pole pairs.

Based on the estimated torque trq_est, a combination in which a torque deviation between the estimated torque trq_est and the command torque trq* becomes minimal is selected at S86.

Incidentally, when the number of phases whose switching timing tsw falls within the switching prohibition period Pp is equal to one (S82: YES), the correction direction may be determined according to the torque deviation.

According to the fourth embodiment, the inverter switching correction portion 63 determines the correction direction with a method corresponding to the number of phases when it is predicted that the switching timing tsw of one or more phases of the inverter 30 fall within the switching prohibition period Pp.

Especially, when it is predicted that the switching timing tsw of two or three phases falls within the switching prohibition period Pp, the inverter switching correction portion 63 selects a combination of the correction directions of the switching timing of a switching element pair in each phase. In this case, it may be possible to suppress torque fluctuation of the motor generator 4 by selecting a combination in which the torque deviation becomes minimal. Therefore, it may be possible to avoid occurrence of superposition surge and to prevent a reduction of a controllability of the switching control apparatus as much as possible.

Fifth Embodiment

Figure 15:
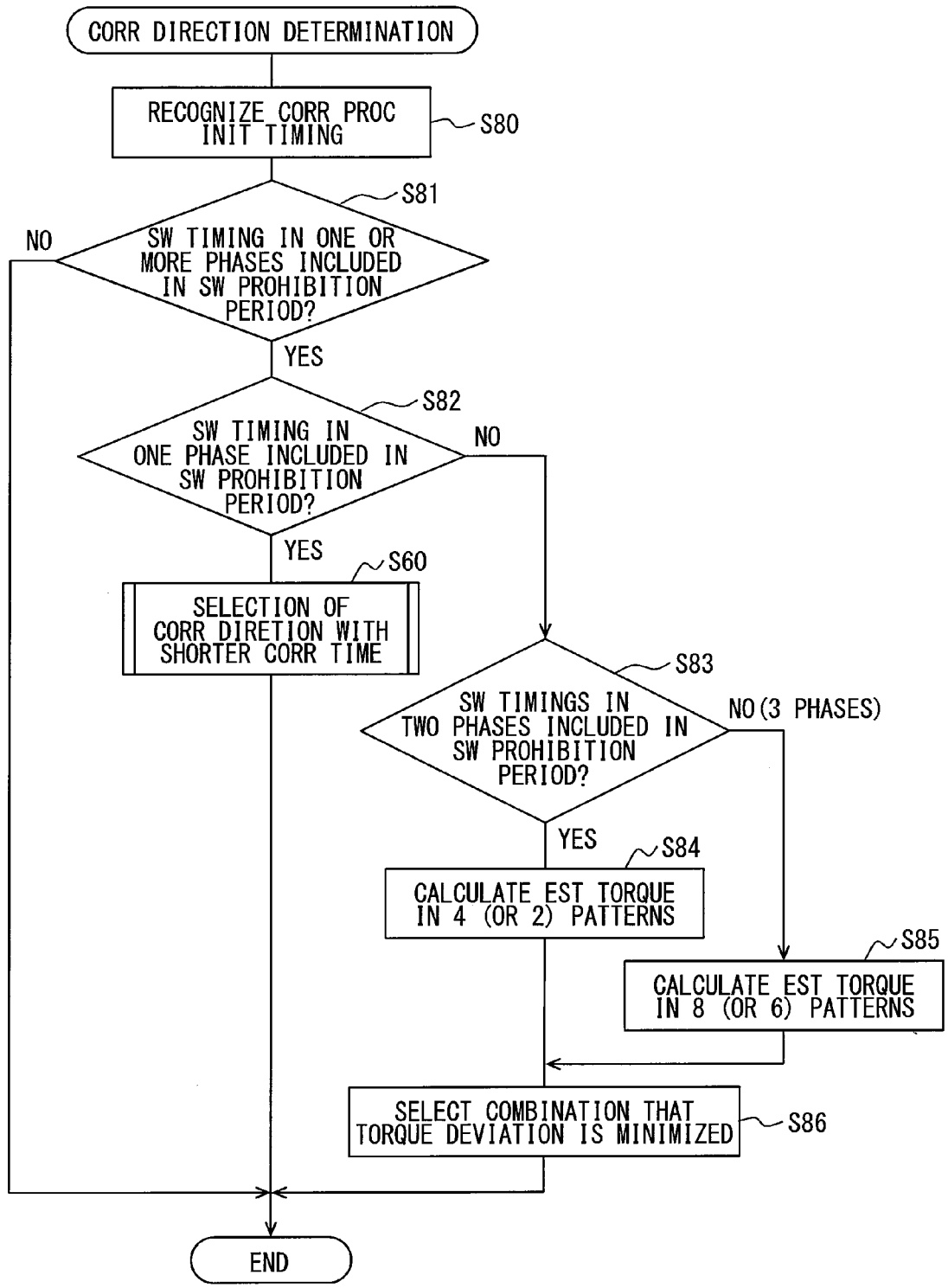
FIG. 15 is a flowchart illustrating the correction direction determination processing according to the fifth embodiment in the present disclosure.

In the fifth embodiment, specific combinations in which the correction directions in each of the phases are identical each other are removed from all combinations in which the estimated torque is calculated at S84 and S85 in the flowchart in FIG. 15.

That is, when the switching timing tsw in two phases falls within the switching prohibition period Pp, a pattern 1 (A/A) and a pattern 4 (B/B) are removed from all patterns in table 3 and the estimated torque is calculated corresponding to the two combinations of pattern 2 and pattern 3. When the switching timing tsw in three phases falls within the switching prohibition period Pp, a pattern 1 (A/A/A) and a pattern 8 (B/B/B) are removed from all patterns in table 4 and the estimated torque is calculated corresponding to the six combinations of patterns 2-7.

A description in a bracket of "(or 2)" at S84 and a bracket of "(or 6)" at S85 in FIG. 15 corresponds to the above explanation.

When the switching timing tsw in two or three phases falls within the switching prohibition period Pp and all switching timings are advanced or delayed in the identical direction, variation of phase voltage and torque fluctuation may increase. According to the present embodiment, a combination in which a correction direction in each phase are identical each other is removed. It may be possible to prevent the torque fluctuation from occurring.

Other Embodiments (a) The DC voltage converter in the present disclosure is not limited to a boost converter that boosts input voltage, and the DC voltage converter may be a step down converter that steps down the input voltage. The boost converter and the step down converter are not limited to an upper and lower arm switching element pair, and the boost/step-down converter may be a converter including at least one switching element.

(b) The power transducer in the present disclosure is not limited to an inverter that converts DC power to AC power, and the power transducer may be an H bridge circuit that converts DC power to DC power and drives a DC motor, for example. In addition, in a case of an inverter, the number of phases of AC power is not limited to three phases, and the number of phases may be four or more phases.

(c) According to the present embodiments, the boost converter control circuit 51 and the inverter control circuit 61 calculate the duty of the switching element as a control amount of the boost converter 20 and the control amount of the inverter 30. The boost converter drive circuit 54 and the inverter drive circuit 64 generate a PWM signal based on a comparison between the duty and a carrier, so that the boost converter drive circuit 54 and the inverter drive circuit 64 perform a PWM control.

A method to generate a drive signal of the switching element is not limited to the present embodiments. A determination of a correction direction of the switching timing in the present disclosure may be applied to any kinds of a switching control apparatus unless the switching control apparatus enables to control switching timing of ON/OFF status by some methods.

In a case In embodiments using a carrier, the carrier is not limited to a triangle wave, and the carrier may be a saw tooth wave.

(d) In order to correct the switching timing for performing a PWM control, the present embodiments changes the duty basically. However as described in a bracket in FIG. 2, the switching timing may be corrected by changing a carrier cycle (frequency).

Furthermore, the switching timing may be defined on a time base, or may be defined on an electric angle of the motor generator 4.

(e) In FIG. 2 in the present embodiments, the boost converter switching correction portion 53 initiates the correction processing when the control calculation of the inverter 30 and the boost converter 20 are completed and the next duty is settled. The boost converter switching correction portion 53 may estimate a next duty based on information such as control fluctuation of voltage magnitude before the next duty is settled by the control calculation.

(f) The load that is driven by electric power output from the power transducer is not limited to a rotary machine such as a motor generator, and the load may be apparatus using high voltage such as a discharge tube, an X-ray generator. When the load corresponds to a load other than a rotary machine, the estimated torque in the fourth embodiment may be substituted with another parameter reflecting an output characteristic of the load.

(g) The rotary machine or the like as the load is not limited to power source of a hybrid vehicle and an electric vehicle, and the rotary machine or the like may be used in an auxiliary machine of a vehicle, an electric train, an elevator, a general machine other than a vehicle. The switching control apparatus in the present disclosure may effectively applied to any system in which superposition of surge voltage may cause trouble at least.

Incidentally, the present disclosure is not limited to the present embodiments, and may be performed in various manners within a technical scope of the present disclosure.

According to one aspect of the present disclosure, a switching control apparatus controlling switching timing of a switching element of a DC voltage converter and a switching element pair of a power transducer is provided. The switching control apparatus is applied to a load drive system including the DC voltage converter and the power transducer.

The DC voltage converter includes a reactor that enables to store and release electric energy and at least one switching element connected to the reactor. By turning ON/OFF the switching element, the DC voltage converter converts input voltage (Vin) input from the DC power source to the reactor to output voltage (VH).

The power transducer includes multiple switching element pairs configured from a high potential switching element and a low potential switching element. By turning ON/OFF a paired switching element alternately, the power transducer converts the DC output from the DC voltage converter to AC power and outputs the AC power to a load.

The switching control apparatus in the present disclosure includes a DC voltage converter control circuit, a DC voltage converter drive circuit, a power transducer control circuit, a power transducer drive circuit, a switching prohibition period calculation portion, and a switching correction portion.

The DC voltage converter control circuit calculates control amount of the DC voltage converter according to command voltage to the output voltage of the DC voltage converter.

The DC voltage converter drive circuit drives the switching element in the DC voltage converter according to the control amount of the DC voltage converter calculated by the DC voltage converter control circuit.

The power transducer control circuit calculates control amount of the power transducer according to a requested output of the load.

The power transducer drive circuit drives the switching element pair of the power transducer according to the control amount of the power transducer calculated by the power transducer control circuit.

The switching prohibition period calculation portion calculates a switching prohibition period (Pp). The switching prohibition period corresponds to a period when switching of the switching element of the DC voltage converter is prohibited over a predetermined period synchronized with the switching timing before the switching timing of at least one of the switching element pairs in the power transducer, or corresponds to a period when switching of the switching element of the power transducer is prohibited over a predetermined period synchronized with a switching timing before the switching timing of at least one switching element of the DC voltage converter.

The switching correction portion sets the switching timing as a correction object switching timing (tsw) when it is predicted that a switching timing of at least one switching element of the DC voltage converter or at least one of the switching element pairs of the power transducer is included I the switching prohibition period. The switching correction portion determines whether the correction object switching timing is corrected to a forward direction in which the correction object switching timing is advanced to a switching prohibition period initiation timing (tpa) or the correction object switching timing is corrected to a backward direction in which the correction object switching timing is delayed to the switching prohibition period end timing (tpb). The switching correction portion corrects the correction object switching timing to the determined correction direction.

Incidentally, a width (length) of the switching prohibition period is set to ensure a period of time for attenuation to an extent so that surge voltage does not affect each switching element by considering magnitude of estimated surge voltage and characteristic variation in each switching element. A concept of the switching prohibition period initiation timing is not limited to a just moment when the switching prohibition period initiates, and includes a period of time having a predetermined length before the initiation timing, which is appropriately set when an immediate before the initiation timing is targeted in this technical field. Similarly, a concept of the switching prohibition period end timing is not limited to a moment when the switching prohibition period ends, and includes a period of time having a predetermined length after the initiation timing, which is appropriately set when an immediate after the end timing is targeted in this technical field.

According to the switching control apparatus in the present disclosure, when it is predicted that the switching timings of the DC voltage converter and the power transducer are overlapped, the correction object switching timing is corrected to the outside to the switching prohibition period and it may be possible to avoid occurrence of superposition surge.

In addition according to the switching control apparatus in the present disclosure, for example, so that variation of a controllability generated by correction becomes minimal, it is determine which correction is more preferable. In one correction, the correction object switching timing is corrected to the switching prohibition period initiation timing in a forward direction. In another correction, the correction object switching timing is corrected to the switching prohibition period end timing in a backward direction. Therefore, as compared with a technology in which the correction object switching timing is always corrected to the backward direction, it may be possible to prevent a reduction of a controllability of the switching control apparatus by correction as much as possible.

Furthermore, the switching control apparatus in the present disclosure may include a DC voltage converter switching correction portion that corrects a switching timing of at least one switching element of the DC voltage converter as the switching correction portion or may include a power transducer switching correction portion that corrects a switching timing of at least one of switching element pairs configuring the power transducer as the switching correction portion.

In addition, in each embodiment, the switching control apparatus may include multiple configurations for determining a correction direction.

In the switching control apparatus that corrects a switching timing of the switching element of the DC voltage converter, the DC voltage converter switching portion may determine the correction direction as follows.

(1) A correction time ($\Delta a$) when the correction object switching timing is corrected to the initiation timing of the switching prohibition period is compared with a correction time ($\Delta b$) when the correction object switching timing is corrected to an end timing of the switching prohibition period, and a correction direction that a correction time is shorter than another correction time.

(2) A detection value or an estimation value of the reactor current (IL) flowing through the DC voltage converter may be obtained and a correction object switching timing may be corrected to a direction that an absolute value of the reactor current becomes small.

(3) An output voltage (VH) of the DC voltage and a command voltage (VHcom) may be obtained, and the correction object switching timing may be corrected to a direction that the output voltage approaches the command voltage.

When a correction direction of the correction object switching timing may be temporarily determined, the correction object switching timing may be corrected to the temporarily determined correction direction, and when an interval between a switching timing after correction and a previous switching timing falls below a predetermined lower limit threshold ($\alpha$) or the interval exceeds a predetermined upper limit threshold ($\beta$), the correction direction may be adjusted to a direction opposite to the temporarily determined correction direction.

In the switching control apparatus correcting the switching timing of the switching element pair configuring the power transducer, the power transducer switching correction portion may select a correction direction that the correction time becomes shorter than another direction similar to a case where the switching timing of the switching element in the DC voltage converter is corrected.

When a load corresponds to a polyphase AC motor, a torque deviation between an estimated torque of the polyphase AC motor after correction and a command torque may be calculated and a correction direction may be selected so that the torque deviation becomes minimal.

A phase voltage of the estimated torque of the polyphase AC motor may be calculated from a ON time of the switching element pair after correction. A dq-axis estimated current may be calculated from a dq-axis estimated voltage obtained by performing a dq conversion of the phase voltage using a voltage equation including a circuit constant of the polyphase AC motor. The estimated torque of the polyphase AC motor may be calculated from the dq-axis estimated current using a torque expression or a map.

In addition, when the switching timing of switching element pairs in multiple phases is included in a switching prohibition period, the power converter switching correction portion may select a combination of correction directions of the switching timing of each switching element pair with respect of the multiple correction object switching element pairs. In this case, a combination where correction directions of the multiple correction object switching element pairs with respect to the switching timing are the identical direction may be removed.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A switching control apparatus
  applied to a load drive system that includes
    a DC voltage converter having a reactor that enables to store and release electric energy and at least one switching element connected to the reactor, and converting an input voltage, which is input from a DC power source to the reactor, to an output voltage by turning ON and OFF the at least one switching element, and
    a power transducer including a plurality of switching element pairs having a high potential switching element and a low potential switching element, turning ON and OFF the plurality of switching element pairs, converting DC power, which is output from the DC voltage converter, to AC power, and outputting the AC power to a load, and
  controlling a switching of the switching element in the DC voltage converter and the switching element pairs in the power transducer, the switching control apparatus comprising:
    a DC voltage converter control circuit calculating a control amount of the DC voltage converter according to a command voltage to the output voltage of the DC voltage converter;
    a DC voltage converter drive circuit driving the switching element in the DC voltage converter according to the control amount of the DC voltage converter calculated by the DC voltage converter control circuit;
    a power transducer control circuit calculating a control amount of the power transducer according to a required output that the load requests;
    a power transducer drive circuit driving the switching element pairs in the power transducer according to the control amount of the power transducer calculated by the power transducer control circuit;
    a switching prohibition period calculation portion calculating a switching prohibition period of the switching element in the DC voltage converter or the switching element pairs in the power transducer, wherein
      (i) in a case where at least one of the switching element pairs in the power transducer turns ON and OFF therebetween at a first switching time, the switching element in the DC voltage converter is prohibited, in advance of the first switching time, from switching during the switching prohibition period, the switching prohibition period being synchronized with the first switching time, or
      (ii) in a case where at least one switching element in the DC voltage converter turns ON and OFF therebetween at a second switching time, the switching element pairs in the power transducer are prohibited, in advance of the second switching time, from switching during the switching prohibition period, the switching prohibition period being synchronized with the second switching time; and
    a switching correction portion determining a correction direction of a correction object switching time and correcting the correction object switching time to the correction direction, wherein
    when the first switching time of the at least one of the switching element pairs in the power transducer or the second switching time of the at least one switching element in the DC voltage converter is predicted to be included in the switching prohibition period, the first switching time or the second switching time correspond to the correction object switching time,
    the switching correction portion determines the correction direction of the correction object switching time and determines whether the correction object switching time is advanced to an initiation of the switching prohibition period or the correction object switching time is delayed to an end of the switching prohibition period,
    when the switching correction portion determines the correction direction, the switching correction portion corrects the correction object switching time a determined correction direction.

2. The switching control apparatus according to claim 1, wherein the switching correction portion corresponds to a DC voltage converter switching correction portion, the DC voltage converter switching correction portion corrects the second switching time of the at least one switching element in the DC voltage converter, the switching prohibition period calculation portion calculates the switching prohibition period during which the switching element in the DC voltage converter is prohibited from switching in advance of the first switching time, the prohibition period being synchronized with the first switching time, when the second switching time of the switching element of the DC voltage converter is predicted to be in the switching prohibition period, the DC voltage converter switching correction portion sets the second switching time as the correction object switching time, the DC voltage converter switching correction portion determines the correction direction of the correction object switching time and determines whether the correction object switching time is advanced to the initiation of the switching prohibition period or the correction object switching time is delayed to the end of the switching prohibition period, and the DC voltage converter switching correction portion corrects the correction object switching time the determined correction direction.

3. The switching control apparatus according to claim 2, wherein a forward correction time corresponds to a time obtained by correcting the correction object switching time to the initiation of the switching prohibition period, a backward correction time corresponds to a time obtained by correcting the correction object switching time to the end of the switching prohibition period, the DC voltage converter switching correction portion compares the forward correction time and the backward correction time, and the DC voltage converter switching correction portion selects one of the forward correction time and the backward correction time being shorter than an other of the forward correction time and the backward correction time and selects the correction direction corresponding to the one of the forward correction time and the backward correction time.

4. The switching control apparatus according to claim 2, wherein the DC voltage converter switching correction portion obtains
a detection value of a reactor current flowing through the reactor in the DC voltage converter, or
an estimated value of the reactor current that is estimated based on an ON time of the switching element and information including a circuit constant of the DC voltage converter, and the DC voltage converter switching correction portion corrects the correction object switching time and an absolute value of the reactor current becomes small.

5. The switching control apparatus according to claim 2, wherein the DC voltage converter switching correction portion obtains the output voltage of the DC voltage converter and the command voltage required as an output of the DC voltage converter, and the DC voltage converter switching correction portion corrects the correction object switching time and the output voltage approaches the command voltage.

6. The switching control apparatus according to claim 2, wherein the DC voltage converter switching correction portion temporarily determines the correction direction of the correction object switching time, and when the correction object switching time is corrected to a temporarily determined correction direction and an interval between a switching time after correction and a previously performed switching time falls below a predetermined lower limit threshold, the DC voltage converter switching correction portion adjusts the correction direction to a direction opposite to the temporarily determined correction direction.

7. The switching control apparatus according to claim 2, wherein the DC voltage converter switching correction portion temporarily determines the correction direction of the correction object switching time, and when the correction object switching time is corrected to a temporarily determined correction direction and an interval between a switching time after correction and a previously performed switching time exceeds a predetermined upper limit threshold, the DC voltage converter switching correction portion adjusts the correction direction to a direction opposite to the temporarily determined correction direction.

8. The switching control apparatus according to claim 1, wherein the switching correction portion corresponds to a power transducer switching correction portion, the power transducer switching correction portion corrects the first switching time of the at least one of the switching element pairs in the power transducer, the switching prohibition period calculation portion calculates the switching prohibition period during which the switching element pairs in the power transducer are prohibited from switching in advance of the second switching time, the switching prohibition period being synchronized with the second switching time, when the first switching time of the at least one of the switching element pairs in the power transducer is predicted to be in the switching prohibition period, the power transducer switching correction portion sets the first switching time as the correction object switching time, the power transducer switching correction portion determines the correction direction of the correction object switching time and determines whether the correction object switching time is advanced to the initiation of the switching prohibition period or the correction object switching time is delayed to the end of the switching prohibition period, and the power transducer switching correction portion corrects the correction object switching time the determined correction direction.

9. The switching control apparatus according to claim 8, wherein a forward correction time corresponds to a time obtained by correcting the correction object switching time to the initiation of the switching prohibition period, a backward correction time corresponds to a time obtained by correcting the correction object switching time to the end of the switching prohibition period, the power transducer switching correction portion compares the forward correction time and the backward correction time, and the power transducer switching correction portion selects one of the forward correction time and the backward correction time being shorter than an other of the forward correction time and the backward correction time and selects the correction direction corresponding to the one of the forward correction time and the backward correction time.

10. The switching control apparatus according to claim 8, wherein the load corresponds to a polyphase AC motor, when the correction object switching time is corrected to the initiation of the switching prohibition period or when the correction object switching time is corrected to the end of the switching prohibition period, the power transducer switching correction portion calculates a torque deviation between an estimated torque of the polyphase AC motor and a command torque required in the polyphase AC motor, the estimated torque of the polyphase AC motor is calculated based on an ON time of the switching element pair after correction and information including a circuit constant of the polyphase AC motor, and the power transducer switching correction portion selects the correction direction of the correction object switching time and the torque deviation is minimal.

11. The switching control apparatus according to claim 8, wherein when switching times of the plurality of the switching element pairs in the power transducer are predicted to be in the switching prohibition period, the power transducer switching correction portion selects a combination of correction directions of the switching times of the plurality of the switching element pairs with respect to the plurality of the switching element pairs to be corrected.

12. The switching control apparatus according to claim 11, wherein the power transducer switching correction portion removes a combination in which the correction directions of the switching times of all of the switching element pairs to be corrected correspond to an identical direction.

* * * * *